(12) United States Patent
Szatmary et al.

(10) Patent No.: US 12,239,270 B2
(45) Date of Patent: Mar. 4, 2025

(54) SYSTEMS, APPARATUSES, AND METHODS FOR A DISTRIBUTED ROBOTIC NETWORK OF DATA COLLECTION AND INSIGHT GENERATION

(71) Applicant: Brain Corporation, San Diego, CA (US)

(72) Inventors: Botond Szatmary, San Diego, CA (US); David Ross, San Diego, CA (US)

(73) Assignee: Brain Corporation, San Diego, CA (US)

(*) Notice: Subject to any disclaimer, the term of this patent is extended or adjusted under 35 U.S.C. 154(b) by 409 days.

(21) Appl. No.: 17/490,286

(22) Filed: Sep. 30, 2021

(65) Prior Publication Data

US 2022/0039625 A1 Feb. 10, 2022

Related U.S. Application Data

(63) Continuation of application No. PCT/US2020/026314, filed on Apr. 2, 2020.

(60) Provisional application No. 62/827,951, filed on Apr. 2, 2019.

(51) Int. Cl.
| | |
|---|---|
| *A47L 11/40* | (2006.01) |
| *A47L 9/28* | (2006.01) |
| *G05D 1/00* | (2024.01) |
| *H04L 67/00* | (2022.01) |
| *H04L 67/125* | (2022.01) |
| *H04L 67/5683* | (2022.01) |

(Continued)

(52) U.S. Cl.
CPC ......... *A47L 11/4011* (2013.01); *A47L 9/2857* (2013.01); *G05D 1/0016* (2013.01); *G05D 1/0022* (2013.01); *A47L 2201/06* (2013.01)

(58) Field of Classification Search
None
See application file for complete search history.

(56) References Cited

U.S. PATENT DOCUMENTS 10,133,275 B1* 11/2018 Kobilarov ................ G06N 3/08
10,649,469 B2* 5/2020 Salas-Moreno ...... G01C 21/383
11,468,344 B2* 10/2022 Ron ........................ H04L 67/63
(Continued)

OTHER PUBLICATIONS

Supplemental European Search Report for EP 20783695.8 dated Oct. 14, 2022.

(Continued)

*Primary Examiner* — Jaime Figueroa
*Assistant Examiner* — Atticus A Cameron
(74) *Attorney, Agent, or Firm* — Pierson Ferdinand LLP; Sidharth Kapoor

(57) ABSTRACT

Systems, apparatuses, and methods for a distributed network of data collection and insight generation by server are disclosed herein. According to at least one non-limiting exemplary embodiment, the server may be configured to receive data from a network of data sources, receive an application from an application creator, and execute the application based on the data from the network of data sources to generate at least one insight, wherein the network of data sources may comprise mobile robots, stationary devices, IoT (Internet of Things) devices, and/or public data sources. The at least one insight may be utilized by robots to improve efficiency of operation or by humans to gain useful insights to the environment in which the data sources operate.

18 Claims, 9 Drawing Sheets

(51) Int. Cl.
*H04W 4/70* (2018.01)
*H04W 12/069* (2021.01)

(56) References Cited

U.S. PATENT DOCUMENTS

| | | |
|---|---|---|
| 2011/0035187 A1 | 2/2011 | Dejori et al. |
| 2013/0290234 A1* | 10/2013 | Harris .................... G06Q 30/00 901/50 |
| 2014/0207280 A1 | 7/2014 | Duffley et al. |
| 2018/0147721 A1 | 5/2018 | Griffin et al. |

OTHER PUBLICATIONS

International Search Report and Written Opinion dated Jun. 29, 2020 for PCT/US20/26314.

* cited by examiner

US 12,239,270 B2

SYSTEMS, APPARATUSES, AND METHODS FOR A DISTRIBUTED ROBOTIC NETWORK OF DATA COLLECTION AND INSIGHT GENERATION

PRIORITY

This application is a continuation of International Patent Application No. PCT/US20/26314 filed Apr. 2, 2020 and claims the benefit of U.S. provisional patent application No. 62/827,951 filed on Apr. 2, 2019, under 35 U.S.C. § 119, the entire disclosure of each are incorporated herein by reference.

COPYRIGHT

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Background

Currently, many robots may comprise a plurality of sensors, internal monitoring units ("IMUs"), cameras, light detection and ranging ("LiDAR") sensors, and the like to perceive their environment and operate effectively. These sensors may collect a large aggregate of data over time, most of which may be of marginal utility to the robots to operate effectively. This data, however, may be of use for a plurality of additional functionalities of the robots, other robots, or may be of value to humans operating in conjunction with the robots.

Additionally, a plurality of other sensor systems may be utilized in conjunction with robots in an environment. These systems may comprise, for example, internet of things ("IoT") devices, stationary data collection devices (e.g., security cameras, pressure sensors in parking lots, etc.), and/or publicly available data sources. These systems may be communicatively coupled to a server or network which may be further communicatively coupled to the robots to further improve operative efficiency of the robots.

The plurality of systems utilized in conjunction with a network of robots may provide a distributed system of data collection across a wide variety of environments. This data may, in part, be of marginal utility to the robots but may, however, be utilized by humans to perform additional functionality and gain new insights. Accordingly, there is a need in the art for systems, apparatuses, and methods for utilizing data collected by robots and other systems such that insights may be drawn from a wealth, or great amount, of data collected by the robots and other systems. These insights may be utilized by the robots to improve efficiency or may be utilized by humans for a plurality of use cases.

SUMMARY

The foregoing needs are satisfied by the present disclosure, which provides for, inter alia, systems, apparatuses, and methods for a distributed robotic network of data collection and insight generation. The present disclosure is directed towards a practical application of data collection using a distributed system of robotic devices for production of insights for improving both robotic and human productivity.

The present application relates generally to robotics, and more specifically to systems, apparatuses, and methods for a distributed robotic network of data collection and insight generation. Exemplary embodiments described herein have innovative features, no single one of which is indispensable or solely responsible for their desirable attributes. Without limiting the scope of the claims, some of the advantageous features will now be summarized.

According to at least one non-limiting exemplary embodiment, an AI marketplace system is disclosed. The AI marketplace may comprise a network of communicatively coupled data collection sources, a non-transitory computer-readable storage medium comprising a plurality of instructions embodied thereon, and a specialized processor configured to execute the instructions to: receive an application from an application creator, receive data from the data collection sources and store the data in a data marketplace, and generate at least one insight by executing the application using the data of the data marketplace. The instructions may further configure the specialized processor to generate a feedback signal to the data collection sources to configure the data collection sources to collect additional data to be utilized by the application. The feedback signal may be further configured as an input to a dynamic filtering unit, the dynamic filtering unit being configured to transmit more or less data (i.e., perform more or less filtering) to the data marketplace. The instructions may further configure the specialized processor to generate at least one additional insight based on data of the data marketplace and at least one previously generated insight by executing a subsequent application. The instructions may further configure the specialized processor to generate a log of usage data of the previously generated insight by the subsequent application. The plurality of data sources may comprise a network of robotic mobile platforms, internet of things (IoT) devices, stationary data sources (e.g., stationary sensors), and/or publicly available data sources.

According to at least one non-limiting exemplary embodiment, a system is disclosed. The system may comprise: a plurality of data collection devices coupled to a server; a non-transitory computer readable memory comprising a plurality of computer readable instructions stored thereon; and at least one processor configured to execute the computer readable instructions to: receive an application from an application creator; receive data from a respective one of the plurality of data collection devices; and execute the application to generate at least one insight using the data received from the respective one of the plurality of data collection devices. According to at least one non-limiting exemplary embodiment, the at least one processor is further configured to execute the computer readable instructions to: generate a feedback signal based on a data request from the application, the feedback signal being communicated to the respective one of the plurality of data collection devices, the feedback signal comprising at least one of a request to collect additional data or an input to a dynamic filtering unit.

According to at least one non-limiting exemplary embodiment, the at least one processor is further configured to: filter data collected by the respective one of the plurality of data collection devices based on the feedback signal and a determination of value of the data collected. According to at least one non-limiting exemplary embodiment, the at least one processor is further configured to execute the computer readable instructions to: execute a different second application to generate at least one second insight based on the data from the respective one of the plurality of data collection devices and at the least one insight. According to at least one non-limiting exemplary embodiment, the at least one processor is further configured to execute the computer readable instructions to: generate a log comprising a record of usages of the at least one insight by the different second application. According to at least one non-limiting exemplary embodiment, the data collection devices comprise of one or more of robots and at least one of a stationary device, internet of things (IoT) device, or database communicatively coupled to the server.

According to at least one non-limiting exemplary embodiment, the one or more robots include at least one robotic floor cleaner. According to at least one non-limiting exemplary embodiment, the at least one processor is further configured to execute the computer readable instructions to: restrict access to data collected by the data collection devices based on credentials of a consumer of the at least one insight, the restriction of access being performed by an application programing interface (API). According to at least one non-limiting exemplary embodiment, the non-transitory computer readable memory contains data representing credentials of the consumer, the credentials enable the application to access certain data collected by the data collection sources, the access being provided by the API verifying the credentials of the application creator are sufficient to access the data.

According to at least one non-limiting exemplary embodiment, the consumers include at least one of a robot, another application, or a human. According to at least one non-limiting exemplary embodiment, the system may further comprise: a user interface configured to receive the application from the application creator, the user interface includes one of a user interface of a robot, a client interface being embodied on a local device of the application creator which couples the local device to the server, or a web terminal or website. According to at least one non-limiting exemplary embodiment, the system may further comprise a user interface configured to receive a request for use of the application by a consumer, the user interface includes one of a user interface of a robot, a client interface being embodied on a local device of the consumer which couples the local device to the server, or a web terminal or site. According to at least one non-limiting exemplary embodiment, the application is executed by the at least one processor of the server; and the at least one insight is received by the consumer using the user interface.

According to at least one non-limiting exemplary embodiment, the receipt of the at least one insight is recorded by the at least one processor of the server and stored in a log; and the application creator can view the log to view the receipt of the at least one insight by the consumer. According to at least one non-limiting exemplary embodiment, the at least one processor is further configured to execute the computer readable instructions to: produce an invoice to the consumer based on the usage of the insights stored in the log, the invoice configures payment at least in part to the application creator. According to at least one non-limiting exemplary embodiment, the at least one insight of the application is at least one of: item identification, signal strength mapping of a Wi-Fi or cellular signal, or identification of people using data collected at least in part by one or more robotic devices. According to at least one non-limiting exemplary embodiment, a system is disclosed. The system may comprise: a memory comprising a plurality of computer readable instructions embodied thereon; and at least one controller configured to execute the computer readable instructions to: receive a request for use of an application from a consumer device, the application being stored in the memory; execute the application using data collected at least in part by one or more data sources to produce an insight, the one or more data sources comprise at least one robotic device; and communicate the insight to the consumer device.

According to at least one non-limiting exemplary embodiment, a method is disclosed. The method may comprise a processor of a server: receiving a request for use of an application from a consumer device, the application being stored in a memory; executing the application using data collected at least in part by one or more data sources to produce an insight; generating a feedback signal based on a data request from the application, the feedback signal being communicated to the one or more data sources, the feedback signal comprising at least one of a request to collect additional data or an input to a dynamic filtering unit; filtering data collected by the at least in part by one or more data sources based on the feedback signal and a determination of value of the data collected; and communicating the insight to the consumer device.

These and other objects, features, and characteristics of the present disclosure, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the disclosure. As used in the specification and in the claims, the singular form of "a", "an", and "the" include plural referents unless the context clearly dictates otherwise.

BRIEF DESCRIPTION OF THE DRAWINGS

The disclosed aspects will hereinafter be described in conjunction with the appended drawings, provided to illustrate and not to limit the disclosed aspects, wherein like designations denote like elements.

Figure 1A:
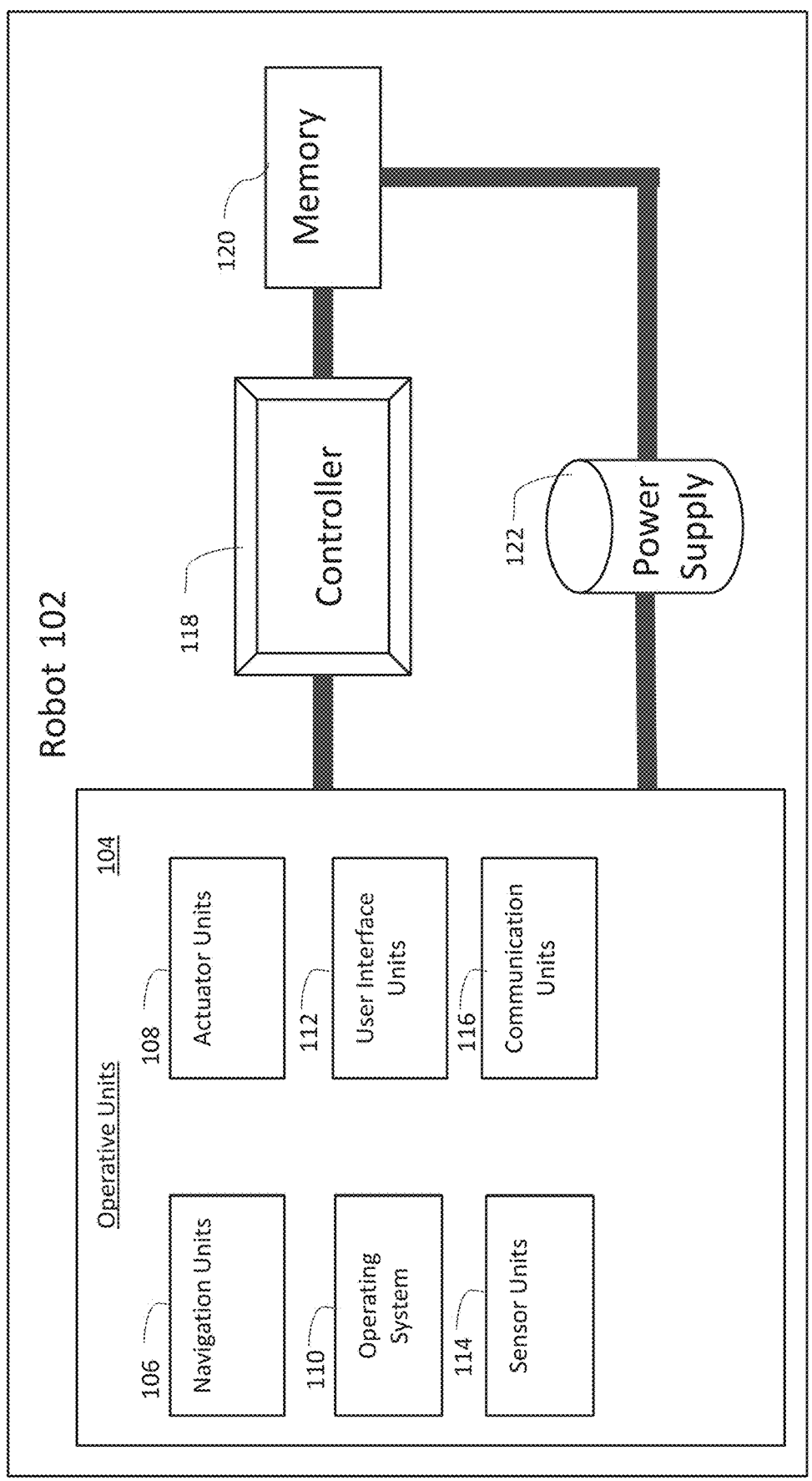
FIG. 1A is a functional block diagram of a main robot in accordance with some embodiments of this disclosure.

All Figures disclosed herein are ©Copyright 2020 Brain Corporation. All rights reserved.

DETAILED DESCRIPTION

Various aspects of the novel systems, apparatuses, and methods disclosed herein are described more fully hereinafter with reference to the accompanying drawings. This disclosure can, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein, one skilled in the art would appreciate that the scope of the disclosure is intended to cover any aspect of the novel systems, apparatuses, and methods disclosed herein, whether implemented independently of, or combined with, any other aspect of the disclosure. For example, an apparatus may be implemented or a method may be practiced using any number of the aspects set forth herein. In addition, the scope of the disclosure is intended to cover such an apparatus or method that is practiced using other structure, functionality, or structure and functionality in addition to or other than the various aspects of the disclosure set forth herein. It should be understood that any aspect disclosed herein may be implemented by one or more elements of a claim.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, and/or objectives. The detailed description and drawings are merely illustrative of the disclosure rather than limiting, the scope of the disclosure being defined by the appended claims and equivalents thereof.

The present disclosure provides for systems, apparatuses, and methods for a distributed robotic network of data collection and insight generation. As used herein, a robot may include mechanical and/or virtual entities configured to carry out a complex series of tasks or actions autonomously. In some exemplary embodiments, robots may be machines that are guided and/or instructed by computer programs and/or electronic circuitry. In some exemplary embodiments, robots may include electro-mechanical components that are configured for navigation, where the robot may move from one location to another. Such robots may include autonomous and/or semi-autonomous cars, floor cleaners, rovers, drones, planes, boats, carts, trams, wheelchairs, industrial equipment, stocking machines, mobile platforms, personal transportation devices (e.g., hover boards, SEGWAYS®, etc.), stocking machines, trailer movers, vehicles, and the like. Robots may also include any autonomous and/or semi-autonomous machine for transporting items, people, animals, cargo, freight, objects, luggage, and/or anything desirable from one location to another.

As used herein, "AI" in an AI marketplace may denote artificial intelligence (e.g., computer learning), autonomous insights, or artificial intermediary (e.g., between an application creator and data collection sources, described below) and is not intended to be limiting to one denotation.

As used herein, credentials may comprise access codes, private/public key encryption schemes, user identification numbers, digital tickets/tokens, digital currency, and the like. Credentials may be utilized by the systems described herein to ensure secure and permission-based access to data as described in the figures below.

As used herein, insights may correspond to outputs or results of a processor executing computer readable instructions to process a set of data. The computer readable instructions may correspond to an application configured by an application creator or developer, as described in the figures below. Insights may comprise for example and without limitation, for instance, results of mathematical operations, predictions of future states or values, identifications of objects (e.g., within images), organization of data (e.g., in a human readable format), identifications of trends, and/or any other result produced by analyzing (i.e., processing) data. Although specific exemplary applications and corresponding insights are provided herein, none are intended to be limiting.

As used herein, network interfaces may include any signal, data, or software interface with a component, network, or process including, without limitation, those of the FireWire (e.g., FW400, FW800, FWS800T, FWS1600, FWS3200, etc.), universal serial bus ("USB") (e.g., USB 1.X, USB 2.0, USB 3.0, USB Type-C, etc.), Ethernet (e.g., 10/100, 10/100/1000 (Gigabit Ethernet), 10-Gig-E, etc.), multimedia over coax alliance technology ("MoCA"), Coaxsys (e.g., TVNET™), radio frequency tuner (e.g., in-band or OOB, cable modem, etc.), Wi-Fi (802.11), WiMAX (e.g., WiMAX (802.16)), PAN (e.g., PAN/802.15), cellular (e.g., 3G, LTE/LTE-A/TD-LTE/TD-LTE, GSM, etc.), IrDA families, etc. As used herein, Wi-Fi may include one or more of IEEE-Std. 802.11, variants of IEEE-Std. 802.11, standards related to IEEE-Std. 802.11 (e.g., 802.11 a/b/g/n/ac/ad/af/ah/ai/aj/aq/ax/ay), and/or other wireless standards.

As used herein, processor, microprocessor, and/or digital processor may include any type of digital processing device such as, without limitation, digital signal processors ("DSPs"), reduced instruction set computers ("RISC"), complex instruction set computers ("CISC"), microprocessors, gate arrays (e.g., field programmable gate arrays ("FPGAs")), programmable logic device ("PLDs"), reconfigurable computer fabrics ("RCFs"), array processors, secure microprocessors, and application-specific integrated circuits ("ASICs"). Such digital processors may be contained on a single unitary integrated circuit die or distributed across multiple components.

As used herein, computer program and/or software may include any sequence or human or machine cognizable steps which perform a function. Such computer program and/or software may be rendered in any programming language or environment including, for example, C/C++, C#, Fortran, COBOL, MATLAB™, PASCAL, GO, RUST, SCALA, Python, assembly language, markup languages (e.g., HTML, SGML, XML, VoXML), and the like, as well as object-oriented environments such as the Common Object Request Broker Architecture ("CORBA"), JAVA™ (including J2ME, Java Beans, etc.), Binary Runtime Environment (e.g., "BREW"), and the like.

As used herein, connection, link, and/or wireless link may include a causal link between any two or more entities (whether physical or logical/virtual), which enables information exchange between the entities.

As used herein, computer and/or computing device may include, but are not limited to, personal computers ("PCs") and minicomputers, whether desktop, laptop, or otherwise, mainframe computers, workstations, servers, personal digital assistants ("PDAs"), handheld computers, embedded computers, programmable logic devices, personal communicators, tablet computers, mobile devices, portable navigation aids, J2ME equipped devices, cellular telephones, smart phones, personal integrated communication or entertainment devices, and/or any other device capable of executing a set of instructions and processing an incoming data signal.

Detailed descriptions of the various embodiments of the system and methods of the disclosure are now provided. While many examples discussed herein may refer to specific exemplary embodiments, it will be appreciated that the described systems and methods contained herein are applicable to any kind of robot. Myriad other embodiments or uses for the technology described herein would be readily envisaged by those having ordinary skill in the art, given the contents of the present disclosure.

Advantageously, the systems and methods of this disclosure at least: (i) make use of excess data collected by robots and other devices; (ii) improve efficiency of robots my generating useful insights which may optimize operation of the robots; (iii) improve working efficiency of humans within an environment using insights; and (iv) provide a platform for developers to generate useful insights whilst maintaining security of data collected by the robots and other devices. Other advantages are readily discernable by one having ordinary skill in the art given the contents of the present disclosure.

According to at least one non-limiting exemplary embodiment, an AI marketplace system is disclosed. The AI marketplace may comprise a network of communicatively coupled data collection sources, a non-transitory computer-readable storage medium comprising a plurality of instructions embodied thereon, and a specialized processor configured to execute the instructions to: receive an application from an application creator, receive data from the data collection sources and store the data in a data marketplace, and generate at least one insight by executing the application using the data of the data marketplace. The instructions may further configure the processor to generate a feedback signal to the data collection sources to configure the data collection sources to collect additional data to be utilized by the application. The feedback signal may be further configured as an input to a dynamic filtering unit, the dynamic filtering unit being configured to transmit more or less data (i.e., perform more or less filtering) to the data marketplace. The instructions may further configure the processor to generate at least one additional insight based on data of the data marketplace and at least one previously generated insight by executing a subsequent application. The instructions may further configure the processor to generate a log of usage data of the previously generated insight by the subsequent application. The plurality of data sources may comprise a network of robotic mobile platforms, internet of things (IoT) devices, stationary data sources (e.g., stationary sensors), and/or publicly available data sources.

FIG. 1A is a functional block diagram of a robot 102 in accordance with some principles of this disclosure. As illustrated in FIG. 1A, robot 102 may include controller 118, memory 120, user interface unit 112, sensor units 114, navigation units 106, actuator unit 108, and communications unit 116, as well as other components and subcomponents (e.g., some of which may not be illustrated). Although a specific embodiment is illustrated in FIG. 1A, it is appreciated that the architecture may be varied in certain embodiments as would be readily apparent to one of ordinary skill given the contents of the present disclosure. As used herein, robot 102 may be representative at least in part of any robot described in this disclosure.

Controller 118 may control the various operations performed by robot 102. Controller 118 may include and/or comprise one or more processing devices or processors (e.g., microprocessors) and other peripherals. As previously mentioned and used herein, processor, microprocessor, and/or digital processor may include any type of digital processing device such as, without limitation, digital signal processors ("DSPs"), reduced instruction set computers ("RISC"), complex instruction set computers ("CISC") processors, microprocessors, gate arrays (e.g., field programmable gate arrays ("FPGAs")), programmable logic device ("PLDs"), reconfigurable computer fabrics ("RCFs"), array processors, secure microprocessors, and application-specific integrated circuits ("ASICs"). Peripherals may include hardware accelerators configured to perform a specific function using hardware elements such as, without limitation, encryption/description hardware, algebraic processing devices (e.g., tensor processing units, quadratic problem solvers, multipliers, etc.), data compressors, encoders, arithmetic logic units ("ALU"), and the like. Such digital processors may be contained on a single unitary integrated circuit die, or distributed across multiple components.

Controller 118 may be operatively and/or communicatively coupled to memory 120. Memory 120 may include any type of integrated circuit or other storage device configurable to store digital data including, without limitation, read-only memory ("ROM"), random access memory ("RAM"), non-volatile random access memory ("NVRAM"), programmable read-only memory ("PROM"), electrically erasable programmable read-only memory ("EEPROM"), dynamic random-access memory ("DRAM"), Mobile DRAM, synchronous DRAM ("SDRAM"), double data rate SDRAM ("DDR/2 SDRAM"), extended data output ("EDO") RAM, fast page mode RAM ("FPM"), reduced latency DRAM ("RL-DRAM"), static RAM ("SRAM"), flash memory (e.g., NAND/NOR), memristor memory, pseudostatic RAM ("PSRAM"), etc. Memory 120 may provide instructions and data to controller 118. For example, memory 120 may be a non-transitory, computer-readable storage apparatus and/or medium having a plurality of instructions stored thereon, the instructions being executable by a processing apparatus (e.g., controller 118) to operate robot 102. In some cases, the instructions may be configurable to, when executed by the processing apparatus, cause the processing apparatus to perform the various methods, features, and/or functionality described in this disclosure. Accordingly, controller 118 may perform logical and/or arithmetic operations based on program instructions stored within memory 120. In some cases, the instructions and/or data of memory 120 may be stored in a combination of hardware, some located locally within robot 102, and some located remote from robot 102 (e.g., in a cloud, server, network, etc.).

It should be readily apparent to one of ordinary skill in the art that a processor may be external to robot 102 and be communicatively coupled to controller 118 of robot 102 utilizing communication units 116 wherein the external processor may receive data from robot 102, process the data, and transmit computer-readable instructions back to controller 118. In at least one non-limiting exemplary embodiment, the processor may be on a remote server (not shown).

In some exemplary embodiments, memory 120, shown in FIG. 1A, may store a library of sensor data. In some cases, the sensor data may be associated at least in part with objects and/or people. In exemplary embodiments, this library may include sensor data related to objects and/or people in different conditions, such as sensor data related to objects and/or people with different compositions (e.g., materials, reflective properties, molecular makeup, etc.), different lighting conditions, angles, sizes, distances, clarity (e.g., blurred, obstructed/occluded, partially off frame, etc.), colors, surroundings, and/or other conditions. The sensor data in the library may be taken by a sensor (e.g., a sensor of sensor units 114 or any other sensor) and/or generated automatically, such as with a computer program that is configurable to generate/simulate (e.g., in a virtual world) library sensor data (e.g., which may generate/simulate these library data entirely digitally and/or beginning from actual sensor data) from different lighting conditions, angles, sizes, distances, clarity (e.g., blurred, obstructed/occluded, partially off frame, etc.), colors, surroundings, and/or other conditions. The number of images in the library may depend at least in part on one or more of the amount of available data, the variability of the surrounding environment in which robot 102 operates, the complexity of objects and/or people, the variability in appearance of objects, physical properties of robots, the characteristics of the sensors, and/or the amount of available storage space (e.g., in the library, memory 120, and/or local or remote storage). In exemplary embodiments, at least a portion of the library may be stored on a network (e.g., cloud, server, distributed network, etc.) and/or may not be stored completely within memory 120. As yet another exemplary embodiment, various robots (e.g., that are commonly associated, such as robots by a common manufacturer, user, network, etc.) may be networked so that data captured by individual robots are collectively shared with other robots. In such a fashion, these robots may be configurable to learn and/or share sensor data in order to facilitate the ability to readily detect and/or identify errors and/or assist events.

Still referring to FIG. 1A, operative units 104 may be coupled to controller 118, or any other controller, to perform the various operations described in this disclosure. One, more, or none of the modules in operative units 104 may be included in some embodiments. Throughout this disclosure, reference may be to various controllers and/or processors. In some embodiments, a single controller (e.g., controller 118) may serve as the various controllers and/or processors described. In other embodiments different controllers and/or processors may be used, such as controllers and/or processors used particularly for one or more operative units 104. Controller 118 may send and/or receive signals, such as power signals, status signals, data signals, electrical signals, and/or any other desirable signals, including discrete and analog signals to operative units 104. Controller 118 may coordinate and/or manage operative units 104, and/or set timings (e.g., synchronously or asynchronously), turn off/on control power budgets, receive/send network instructions and/or updates, update firmware, send interrogatory signals, receive and/or send statuses, and/or perform any operations for running features of robot 102.

Returning to FIG. 1A, operative units 104 may include various units that perform functions for robot 102. For example, operative units 104 includes at least navigation units 106, actuator units 108, user interface units 112, sensor units 114, and communication units 116. Operative units 104 may also comprise other units that provide the various functionality of robot 102. In exemplary embodiments, operative units 104 may be instantiated in software, hardware, or both software and hardware. For example, in some cases, units of operative units 104 may comprise computer implemented instructions executed by a controller. In exemplary embodiments, units of operative unit 104 may comprise hardcoded logic (e.g., ASICS). In exemplary embodiments, units of operative units 104 may comprise both computer-implemented instructions executed by a controller and hardcoded logic. Where operative units 104 are implemented in part in software, operative units 104 may include units/modules of code configurable to provide one or more functionalities.

In exemplary embodiments, navigation units 106 may include systems and methods that may computationally construct and update a map of an environment, localize robot 102 (e.g., find the position) in a map, and navigate robot 102 to/from destinations. The mapping may be performed by imposing data obtained in part by sensor units 114 into a computer-readable map representative at least in part of the environment. In exemplary embodiments, a map of an environment may be uploaded to robot 102 through user interface units 112, uploaded wirelessly or through wired connection, or taught to robot 102 by a user.

In exemplary embodiments, navigation units 106 may include components and/or software configurable to provide directional instructions for robot 102 to navigate. Navigation units 106 may process maps, routes, and localization information generated by mapping and localization units, data from sensor units 114, and/or other operative units 104.

Still referring to FIG. 1A, actuator units 108 may include actuators such as electric motors, gas motors, driven magnet systems, solenoid/ratchet systems, piezoelectric systems (e.g., inchworm motors), magnetostrictive elements, gesticulation, and/or any way of driving an actuator known in the art. According to exemplary embodiments, actuator unit 108 may include systems that allow movement of robot 102, such as motorized propulsion. For example, motorized propulsion may move robot 102 in a forward or backward direction, and/or be used at least in part in turning robot 102 (e.g., left, right, and/or any other direction). By way of illustration, actuator unit 108 may control if robot 102 is moving or is stopped and/or allow robot 102 to navigate from one location to another location. By way of illustration, such actuators may actuate the wheels for robot 102 to navigate a route, navigate around obstacles or move the robot as it conducts a task. Other actuators may rotate cameras and sensors. According to exemplary embodiments, actuator unit 108 may include systems that allow in part for task execution by the robot 102 such as, for example, actuating features of robot 102 (e.g., moving a robotic arm feature to manipulate objects within an environment).

According to exemplary embodiments, sensor units 114 may comprise systems and/or methods that may detect characteristics within and/or around robot 102. Sensor units 114 may comprise a plurality and/or a combination of sensors. Sensor units 114 may include sensors that are internal to robot 102 or external, and/or have components that are partially internal and/or partially external. In some cases, sensor units 114 may include one or more exteroceptive sensors, such as sonars, light detection and ranging ("LiDAR") sensors, radars, lasers, cameras (including video cameras (e.g., red-blue-green ("RBG") cameras, infrared cameras, three-dimensional ("3D") cameras, thermal cameras, etc.), time of flight ("TOF") cameras, structured light cameras, antennas, motion detectors, microphones, and/or any other sensor known in the art. According to some exemplary embodiments, sensor units 114 may collect raw measurements (e.g., currents, voltages, resistances, gate logic, etc.) and/or transformed measurements (e.g., distances, angles, detected points in obstacles, etc.). In some cases, measurements may be aggregated and/or summarized. Sensor units 114 may generate data based at least in part on distance or height measurements. Such data may be stored in data structures, such as matrices, arrays, queues, lists, arrays, stacks, bags, etc.

According to exemplary embodiments, sensor units 114 may include sensors that may measure internal characteristics of robot 102. For example, sensor units 114 may measure temperature, power levels, statuses, and/or any characteristic of robot 102. In some cases, sensor units 114 may be configurable to determine the odometry of robot 102. For example, sensor units 114 may include proprioceptive sensors, which may comprise sensors such as accelerometers, inertial measurement units ("IMU"), odometers, gyroscopes, speedometers, cameras (e.g. using visual odometry), clock/timer, and the like. Odometry may facilitate autonomous navigation and/or autonomous actions of robot 102. This odometry may include robot 102's position (e.g., where position may include robot's location, displacement and/or orientation, and may sometimes be interchangeable with the term pose as used herein) relative to the initial location. Such data may be stored in data structures, such as matrices, arrays, queues, lists, arrays, stacks, bags, etc. According to exemplary embodiments, the data structure of the sensor data may be called an image.

According to exemplary embodiments, user interface units 112 may be configurable to enable a user to interact with robot 102. For example, user interface units 112 may include touch panels, buttons, keypads/keyboards, ports (e.g., universal serial bus ("USB"), digital visual interface ("DVI"), Display Port, E-Sata, Firewire, PS/2, Serial, VGA, SCSI, audioport, high-definition multimedia interface ("HDMI"), personal computer memory card international association ("PCMCIA") ports, memory card ports (e.g., secure digital ("SD") and miniSD), and/or ports for computer-readable medium, mice, rollerballs, consoles, vibrators, audio transducers, and/or any interface for a user to input and/or receive data and/or commands, whether coupled wirelessly or through wires. Users may interact through voice commands or gestures. User interface units 218 may include a display, such as, without limitation, liquid crystal display ("LCDs"), light-emitting diode ("LED") displays, LED LCD displays, in-plane-switching ("IPS") displays, cathode ray tubes, plasma displays, high definition ("HD") panels, 4K displays, retina displays, organic LED displays, touchscreens, surfaces, canvases, and/or any displays, televisions, monitors, panels, and/or devices known in the art for visual presentation. According to exemplary embodiments user interface units 112 may be positioned on the body of robot 102. According to exemplary embodiments, user interface units 112 may be positioned away from the body of robot 102 but may be communicatively coupled to robot 102 (e.g., via communication units including transmitters, receivers, and/or transceivers) directly or indirectly (e.g., through a network, server, and/or a cloud). According to exemplary embodiments, user interface units 112 may include one or more projections of images on a surface (e.g., the floor) proximally located to the robot, e.g., to provide information to the occupant or to people around the robot. The information could be the direction of future movement of the robot, such as an indication of moving forward, left, right, back, at an angle, and/or any other direction. In some cases, such information may utilize arrows, colors, symbols, etc.

According to exemplary embodiments, communications unit 116 may include one or more receivers, transmitters, and/or transceivers. Communications unit 116 may be configurable to send/receive a transmission protocol, such as BLUETOOTH®, ZIGBEE®, Wi-Fi, induction wireless data transmission, radio frequencies, radio transmission, radio-frequency identification ("RFID"), near-field communication ("NFC"), infrared, network interfaces, cellular technologies such as 3G (3GPP/3GPP2), high-speed downlink packet access ("HSDPA"), high-speed uplink packet access ("HSUPA"), time division multiple access ("TDMA"), code division multiple access ("CDMA") (e.g., IS-95A, wideband code division multiple access ("WCDMA"), etc.), frequency hopping spread spectrum ("FHSS"), direct sequence spread spectrum ("DSSS"), global system for mobile communication ("GSM"), Personal Area Network ("PAN") (e.g., PAN/802.15), worldwide interoperability for microwave access ("WiMAX"), 802.20, long term evolution ("LTE") (e.g., LTE/LTE-A), time division LTE ("TD-LTE"), global system for mobile communication ("GSM"), narrowband/frequency-division multiple access ("FDMA"), orthogonal frequency-division multiplexing ("OFDM"), analog cellular, cellular digital packet data ("CDPD"), satellite systems, millimeter wave or microwave systems, acoustic, infrared (e.g., infrared data association ("IrDA")), and/or any other form of wireless data transmission.

Communications unit 116 may also be configurable to send/receive signals utilizing a transmission protocol over wired connections, such as any cable that has a signal line and ground. For example, such cables may include Ethernet cables, coaxial cables, Universal Serial Bus ("USB"), FireWire, and/or any connection known in the art. Such protocols may be used by communications unit 116 to communicate to external systems, such as computers, smart phones, tablets, data capture systems, mobile telecommunications networks, clouds, servers, or the like. Communications unit 116 may be configurable to send and receive signals comprising of numbers, letters, alphanumeric characters, and/or symbols. In some cases, signals may be encrypted, using algorithms such as 128-bit or 256-bit keys and/or other encryption algorithms complying with standards such as the Advanced Encryption Standard ("AES"), RSA, Data Encryption Standard ("DES"), Triple DES, and the like. Communications unit 116 may be configurable to send and receive statuses, commands, and other data/information. For example, communications unit 116 may communicate with a user operator to allow the user to control robot 102. Communications unit 116 may communicate with a server/network (e.g., a network) in order to allow robot 102 to send data, statuses, commands, and other communications to the server. The server may also be communicatively coupled to computer(s) and/or device(s) that may be used to monitor and/or control robot 102 remotely. Communications unit 116 may also receive updates (e.g., firmware or data updates), data, statuses, commands, and other communications from a server for robot 102.

In exemplary embodiments, operating system 110 may be configurable to manage memory 120, controller 118, power supply 122, modules in operative units 104, and/or any software, hardware, and/or features of robot 102. For example, and without limitation, operating system 110 may include device drivers to manage hardware recourses for robot 102.

In exemplary embodiments, power supply 122 may include one or more batteries, including, without limitation, lithium, lithium ion, nickel-cadmium, nickel-metal hydride, nickel-hydrogen, carbon-zinc, silver-oxide, zinc-carbon, zinc-air, mercury oxide, alkaline, or any other type of battery known in the art. Certain batteries may be rechargeable, such as wirelessly (e.g., by resonant circuit and/or a resonant tank circuit) and/or plugging into an external power source. Power supply 122 may also be any supplier of energy, including wall sockets and electronic devices that convert solar, wind, water, nuclear, hydrogen, gasoline, natural gas, fossil fuels, mechanical energy, steam, and/or any power source into electricity.

One or more of the units described with respect to FIG. 1A (including memory 120, controller 118, sensor units 114, user interface unit 112, actuator unit 108, communications unit 116, mapping and localization unit 126, and/or other units) may be integrated onto robot 102, such as in an integrated system. However, according to some exemplary embodiments, one or more of these units may be part of an attachable module. This module may be attached to an existing apparatus to automate so that it behaves like a robot. Accordingly, the features described in this disclosure with reference to robot 102 may be instantiated in a module that may be attached to an existing apparatus and/or integrated onto robot 102 in an integrated system. Moreover, in some cases, a person having ordinary skill in the art would appreciate from the contents of this disclosure that at least a portion of the features described in this disclosure may also be run remotely, such as in a cloud, network, and/or server.

As used herein below, a robot 102, a controller 118, or any other controller, processor, or robot performing a task illustrated in the figures below comprises a controller executing computer-readable instructions stored on a non-transitory computer-readable storage apparatus, such as memory 120, as would be appreciated by one skilled in the art.

Figure 1B:
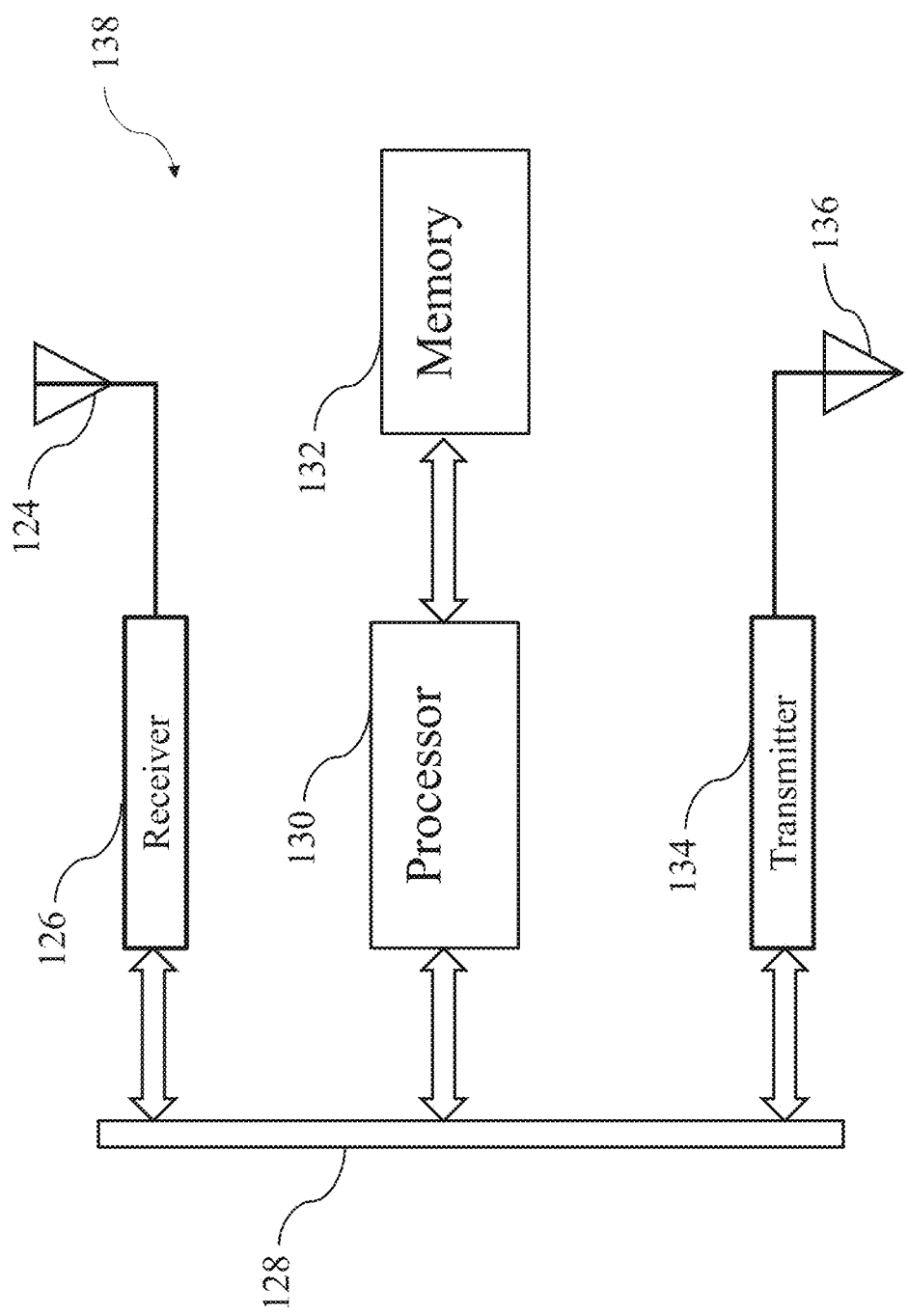
FIG. 1B is a functional block diagram of a controller or processor in accordance with some embodiments of this disclosure.

Next referring to FIG. 1B, the architecture of a processor or processing device 138 is illustrated according to an exemplary embodiment. As illustrated in FIG. 1B, the processing device 138 includes a data bus 128, a receiver 126, a transmitter 134, at least one processor 130, and a memory 132. The receiver 126, the processor 130 and the transmitter 134 all communicate with each other via the data bus 128. The processor 130 is configurable to access the memory 132, which stores computer code or computer-readable instructions in order for the processor 130 to execute the specialized algorithms. As illustrated in FIG. 1B, memory 132 may comprise some, none, different, or all of the features of memory 120 previously illustrated in FIG. 1A. The algorithms executed by the processor 130 are discussed in further detail below. The receiver 126 as shown in FIG. 1B is configurable to receive input signals 124. The input signals 124 may comprise signals from a plurality of operative units 104 illustrated in FIG. 1A including, but not limited to, sensor data from sensor units 114, user inputs, motor feedback, external communication signals (e.g., from a remote server), and/or any other signal from an operative unit 104 requiring further processing. The receiver 126 communicates these received signals to the processor 130 via the data bus 128. As one skilled in the art would appreciate, the data bus 128 is the means of communication between the different components—receiver, processor, and transmitter—in the processing device. The processor 130 executes the algorithms, as discussed below, by accessing specialized computer-readable instructions from the memory 132. Further detailed description as to the processor 130 executing the specialized algorithms in receiving, processing and transmitting of these signals is discussed above with respect to FIG. 1A. The memory 132 is a storage medium for storing computer code or instructions. The storage medium may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage medium may include volatile, nonvolatile, dynamic, static, read/write, read-only, random-access, sequential-access, location-addressable, file-addressable, and/or content-addressable devices. The processor 130 may communicate output signals to transmitter 134 via data bus 128 as illustrated. The transmitter 134 may be configurable to further communicate the output signals to a plurality of operative units 104 illustrated by signal output 136.

One of ordinary skill in the art would appreciate that the architecture illustrated in FIG. 1B may illustrate an external server architecture configurable to effectuate the control of a robotic apparatus from a remote location, such as server 202 illustrated next in FIG. 2. That is, the server may also include a data bus, a receiver, a transmitter, a processor, and a memory that stores specialized computer-readable instructions thereon.

One of ordinary skill in the art would appreciate that a controller 118 of a robot 102 may include one or more processing devices 138 and may further include other peripheral devices used for processing information, such as ASICS, DPS, proportional-integral-derivative ("PID") controllers, hardware accelerators (e.g., encryption/decryption hardware), and/or other peripherals (e.g., analog to digital converters) described above in FIG. 1A. The other peripheral devices when instantiated in hardware are commonly used within the art to accelerate specific tasks (e.g., multiplication, encryption, etc.) which may alternatively be performed using the system architecture of FIG. 1B. In some instances, peripheral devices are used as a means for intercommunication between the controller 118 and operative units 104 (e.g., digital to analog converters and/or amplifiers for producing actuator signals). Accordingly, as used herein, the controller 118 executing computer-readable instructions to perform a function may include one or more processing devices 138 thereof executing computer-readable instructions and, in some instances, the use of any hardware peripherals known within the art. Controller 118 may be illustrative of various processing devices 138 and peripherals integrated into a single circuit die or distributed to various locations of the robot 102 which receive, process, and output information to/from operative units 104 of the robot 102 to effectuate control of the robot 102 in accordance with instructions stored in a memory 120, 132. For example, controller 118 may include a plurality of processing devices 138 for performing high level tasks (e.g., planning a route to avoid obstacles) and processing devices 138 for performing low-level tasks (e.g., producing actuator signals in accordance with the route).

Figure 2:
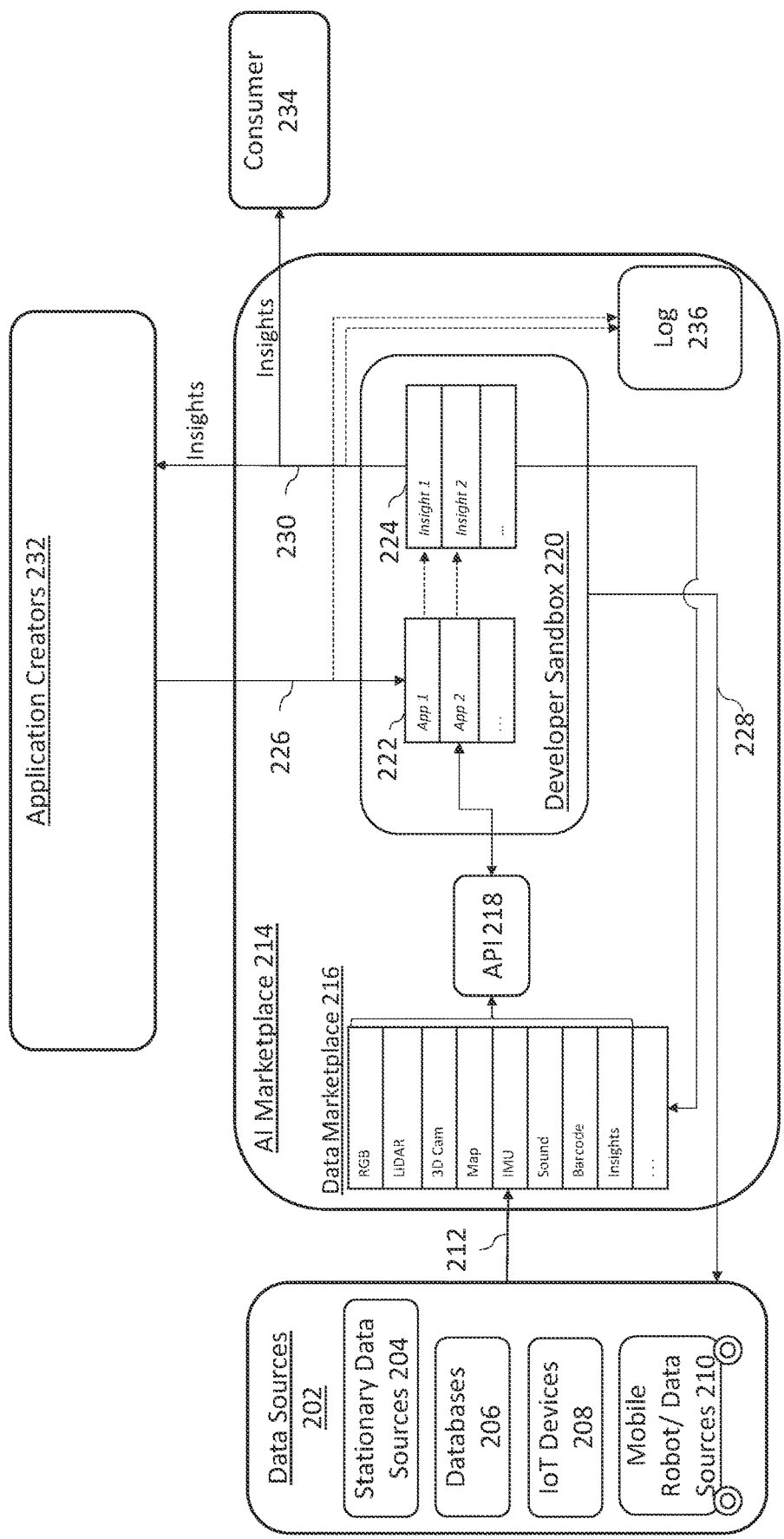
FIG. 2 is a functional block diagram of an AI marketplace and components thereof, according to an exemplary embodiment.

FIG. 2 is a functional block diagram of an artificial intelligence ("AI") marketplace 214, according to an exemplary embodiment. The AI marketplace 214 may be configured to collect and aggregate a large set of data and metadata 212 from a network of data sources 202. The network of data sources 202 may comprise a plurality of data collection devices including, but not limited to, stationary data sources 204, public data sources 206, internet of things ("IoT") devices 208, and mobile robot data sources 210. One skilled in the art may appreciate that the AI marketplace 214 may be realized using a substantially similar architecture as illustrated above in FIG. 1B, wherein the functional blocks illustrated may be representative of a processor 130 executing instructions from a memory 132. For example, the AI Marketplace 214 may be illustrative of a cloud server comprising one or more processing devices 138, the processing devices 138 may be at a centralized location or may be distributed across a plurality of different locations and be embodied within a plurality of different devices. Accordingly, the AI marketplace 214 performing any function as described herein may include the use of one or more processing devices 138 of a server executing computer-readable instructions.

Stationary data sources 204 may comprise any data collection device positioned in a fixed location and/or position. These stationary data collection devices may include, for example, closed circuit television ("CCTV") cameras positioned within an environment configured to collect visual data (e.g., RGB color images, grayscale images, etc.) of the environment. Stationary data sources 204 may further comprise, as another example, WiFi or cell network (e.g., 4G, 5G, etc.) routers, receivers, and/or transceivers configured to collect usage data of a network. Stationary data sources 204 may further comprise any sensors placed within an environment such as, for example, motion sensors (e.g., at entranceways of automatic doors), pressure sensors (e.g., near a shopping cart drop-off zone), and/or other sensors. In some instances, stationary data sources may include user interfaces configurable to receive a user input, such as a touch screen interface configured to receive food orders at a restaurant in lieu of a waiter.

Databases 206 may comprise any available database including, but not limited to, data provide by the United States government (e.g., city maps, public government research data, weather station data, etc.), data provided by published research papers, data stored in private databases with paid or restricted access, publicly available databases, databases which store robot 102 sensor unit 114 data, or any other available data sources or databases.

IoT devices 210 may comprise any device communicatively coupled to an internet or intranet. These devices may include, but are not limited to, some CCTV devices, personal digital assistant ("PDAs") devices, global positioning system ("GPS") tracking devices, smart appliances (e.g., smart refrigerators, coffee machines, etc.), cellular phones, and the like.

Lastly, mobile robot data sources 210 may comprise any mobile semi-autonomous or autonomous platform, such as a robot 102 described above in FIG. 1A, comprising at least one sensor capable of collecting data. Data from the mobile robot data sources 210 may include, but is not limited to, RGB color data from an RGB camera, greyscale image data, LiDAR measurement data, three dimensional ("3D") camera data (i.e., depth camera data), depth imagery, mapping and localization data of an environment, internal monitoring unit ("IMU") data, magnetometer data, sound data from a microphone, barcode data detected using at least one sensor, salient objects or features identified by a robot 102, and metadata (e.g., RGB image metadata, LiDAR measurement metadata, etc.). One skilled in the art may appreciate that mobile robot data sources 210 may collect a large amount of data as the mobile robot data sources 210 perform desired functions, wherein a substantial portion of the collected data may be of marginal utility to the robot data sources 210 and goes widely unused subsequent its use for navigation of the robot. For example, a cleaning robot 102 may comprise a plurality of cameras and LiDAR sensors of sensor units 114, illustrated in FIG. 1A above, which collect images and scans as the robot 102 cleans an environment to ensure safe (i.e., collision free) and effective operation of the robot 102, wherein the robot 102 may additionally, for example, collect IMU data, generate a map data of the environment, and/or collect sound data. The sound data collected, as an example, may not be essential for the cleaning robot 102 to perform its functions (i.e., to clean), however the sound data may be of use to a store owner desiring to know which air vent generates loud white noise. The robot 102 may not be configured to make this determination of which air vent generates loud white noise based on the sound data as the robot 102 may only comprise cleaning software. Accordingly, an AI marketplace 214 may be configured to receive and process the sound data to perform this determination by receiving at least one application 222 from an application creator 232, as further described below.

Advantageously, use of a distributed network of data sources 202 may yield a large amount of data and metadata 212 to be utilized by an AI marketplace 214, wherein large amounts of data and metadata 212 may be further utilized by an application creator 232 to generate additional insights 224 from the data and metadata 212. Use of a network of mobile robot data sources 210 may further yield vast amounts of useful and dynamic data as the network of mobile data sources 210 may collect data within different locations of an environment by moving around the environment while collecting data from sensor units 114. Additionally, use of the network of mobile robot data sources 210 may be advantageous as the network of robot data sources 210 may receive feedback 228 comprising a request for data from, for example, a location within an environment (e.g., an RGB image), IMU data during execution of a maneuver, and the like, wherein the mobile robot data sources 210 may navigate themselves to a location based on the feedback 228 to collect desired data. Lastly, robots 102 typically localize themselves during navigation, wherein the localization data may be utilized to correlate a location to the data collected.

Next, components of the AI marketplace 214 will be described. Data and metadata 212 may arrive to the AI marketplace 214 from the data sources 202 and be stored in a data marketplace 216. The data marketplace 216 may include a plurality of computer-readable storage mediums which store the data and metadata 212 collected by the plurality of data sources 202. Data marketplace 214 may be organized in an indexable and/or searchable format such that data requested by an application programming interface ("API") 218 may be quickly retrieved. The organization structure may include, without limitation, use of network graphs to link data and metadata, tags, sorting the data into libraries, document-retrieval systems, inverted index databases, use of bitmap compression, and/or other applicable data structures. It is appreciated that data stored in the data marketplace 216 may exist on computer-readable storage mediums, the computer-readable storage mediums may be located within a single building or environment (i.e., a central database) and/or may be distributed among a plurality of environments (i.e., stored "in the cloud"). The data may be organized within the data marketplace 216 based at least in part on the metadata associated with the data (e.g., metadata may denote which sensor unit 114 collected an image, which robot 102 collected the image, where the robot 102 is located, and so forth).

The AI marketplace may comprise an API 218 used to interface between applications 222 and the data stored in the data marketplace 216. The API 218 may restrict access to data of the data marketplace 216 to entities of specified credentials such that data may be accessed only by the specified entities as a security measure, as further described below in FIG. 5. The applications 222 may be received by the AI marketplace 214 from application creators 232. Applications 222 comprise computer-readable instructions configured by the application creators 232 which, when executed by a processing device 138 of the AI marketplace 214, configures the processing devices 138 to perform one or more operations using at least in part data from the data marketplace 216. Application creators 232 may include, but are not limited to, original equipment manufacturers ("OEM") of a robot 102, stationary data sources 204, and/or IoT devices 208; owners of a store, warehouse, or other environment comprising at least one data source 202; independent application creators 232 (e.g., hobbyist programmers); and/or companies (e.g., a parent company of a store comprising at least one data source 202). Application creators 232 may provide their applications 222 to the AI marketplace 214 using a developer sandbox 220 comprising a controlled input and output ("I/O") system, wherein any I/O to/from the developer sandbox 220 is restricted to ensure secure storage and access of data within the data marketplace 216. The applications 222 may utilize the API 218 as a medium to access the data stored in the data marketplace 216, wherein the API 218 may provide data to the applications 222 if the creators 232 or consumers 234 of the applications 222 possess the required credentials. The applications 222 may generate at least one insight 224 based on data and metadata of the data marketplace 216 and one or more processing devices 138 of the AI marketplace 218 executing computer-readable instructions to process the data, the computer-readable instructions being configured at least in part by the application creators 232.

By way of an illustrative example, an application creator 232 may comprise a shop owner of a grocery store. The shop owner may develop an application 222 configured to utilize RGB image data collected by a mobile robot data source 210 to count items on shelves of the store for stocking. The AI marketplace 214 may run the application 222 and utilize an API 218 to parse the data of the data marketplace 216 for any image data useful to the application 222 (e.g., RGB images captured nearby the shelves). In some instances, the data accessed may only comprise data collected by data sources 202, which operate within the store of the shop owner, wherein the API 218 may provide the data to the application 222 based on credentials of the shop owner, as discussed below. The application 222 may further utilize, in part, localization data collected by the mobile robot data sources 210 such that the images used by the application 222 correspond to images captured while the mobile robot data sources 210 are nearby shelves in the store. The application 222 may return an insight 224 comprising locations or product IDs (e.g., product names, shelf-keeping unit numbers, etc.) of items which are out of stock such that the shop owner may restock the items. In another example, the application 222 may be configured by a hobbyist programmer and utilized by the store owner (i.e., the store owner is the consumer 234), wherein credentials of the store owner may be utilized by the API 218 such that the application 222 only utilizes data collected by data sources 202 within the store.

In some instances, the API 218 prevents raw data from being directly communicated in its entirety to an application 222 and/or to an application creator 232 as a security measure. For example, an application creator 232 may utilize data collected by a robot 102 network signal analyzer (i.e., a sensor which detects signal strength of a local Wi-Fi network or cellular network) within a building. For security purposes, the names of the networks within the building (e.g., "Tom's Wi-Fi") may be restricted while measurements of signal strength (e.g., SNR, RSSI, or other measurements) may be communicated to the application 222 from the data marketplace 216 via API 218.

Some applications 222 may request data to be collected by one or more data sources 202 at a specified time or require the data sources 202 to collect data which has not been collected previously. Accordingly, the AI marketplace 214, in executing an application 222, may output a feedback 228 signal to one or more of the data sources 202 corresponding to a request for the one or more data sources 202 to collect the desired data required by the application 222. In some embodiments, the feedback 228 signal may comprise a signal for a stationary data source 204 to modify its data collection method such as, for example, a CCTV camera changing its viewing direction upon receiving feedback 228. In some embodiments, feedback signal 228 may be directed to one or more specified data sources 202 (e.g., a specific robot 102 of the plurality of mobile robotic data sources 210). In some embodiments, the feedback signal 228 is configured in part based on credentials of a consumer 234 of the application 222. For example, an owner of a store which includes a robot 102 may utilize an application 222 to produce an insight 224, wherein credentials of the owner (e.g., a user ID) may communicate to the AI marketplace 214 that the feedback signal 228 is to be communicated to the robot 102 of the store owner and not to other robots 102 of other stores. In some embodiments, feedback signal 228 may be communicated to one or more data sources 202 to configure the one or more data sources 202 to filter more or less data, as described in FIG. 4 below. Advantageously, applications 222 of the AI marketplace 214 may utilize the mobility of the mobile robot data sources 210 to collect data of a specified type (e.g., images of a shelf, IMU data of a robot 102 maneuver, heat distribution data of a store, etc.).

Applications 222 may comprise computer-readable instructions which configure a processing device 138 of the AI marketplace 214 to perform a set of functions which utilize, at least in part, data stored in the data marketplace 216 to produce one or more insights 224. The insights 224 may be stored in the data marketplace 216. Insights 224 may include outputs or results of processing data of the data marketplace 216. The results may be based on the purpose of the applications 222, which may be specifically configured by the application creators 232. A plurality of exemplary applications 222 and corresponding insights 224 are illustrated herein, none of which is intended to be limiting as the insights 224 produced by applications 222 are determined by application creators 232 external to the AI marketplace 214.

Insights 224 may leave the developer sandbox 220 via restricted paths 230 to be received by the application creators 232 or a separate consumer 234. The restricted paths 230 may comprise, for example, an encryption standard, key system, credential verification, or access code system configured to ensure insights 224 are received only by entities, such as applications 222, application creators 232, and/or other consumers 234 with required credentials. The restricted paths 230 may ensure data and insights 224 of the data marketplace 216 are only received by entities specified by the application creator 232 (e.g., an arbitrary person may not receive CCTV camera data of a store, whereas an employee of the store may be granted credentials to view the CCTV camera data via an application 222 of the AI marketplace 214). Some applications 222 may yield insights useful for other consumers 234 such as, for example, an application 222 which localizes items in a store such that customers of the store may utilize the application 222 to locate desired items quickly, wherein insights 224 produced by this application may be utilized by any person (e.g., upon payment of a fee). In some instances, insights 224 may be utilized by robots 102 of mobile robot data sources 210 to improve their navigation or task performance. Any use of an insight 224 by an application 222 or a consumer 234 may be stored in a log 236 such that any data in or out of the AI marketplace 214 may be traced to a sender and receiver of the data. The log 236 may utilize, for example, block chain technology, a ledger, or network diagrams/graphs to track all restricted outputs 230 to application creators 232 and/or consumers 234.

According to at least one non-limiting exemplary embodiment, data path 226 may also comprise a restricted data path such that only application developers 232 with required credentials may input applications 222 to the AI marketplace 214 as to avoid unauthorized access to potentially confidential data (e.g., data which may be utilized only by specified application creators 232) via an application 222. According to an alternative non-limiting exemplary embodiment, data path 226 may comprise an unrestricted data path, wherein additional restrictions may be imposed on paths 230 such that insights of potentially confidential data may only be viewed by designated application creators 232 or consumers 234. The additional restrictions to access of the data marketplace 216 may be embodied within the API 218.

Consumers 234 may be illustrative of any person or thing which utilizes the insights 224 produced by applications 222. For example, consumers 234 may include store owners, OEMs, people, robots 102, and/or other human or computerized entities. In some instances, consumers 234 may select one or more applications 222 of a plurality of applications 222 to utilize, the selection may be performed using a web-based terminal (e.g., a browser or website) or a client-based terminal (e.g., a client installed on a computer of the consumer 234), wherein the terminal couples a device of the consumer 234 to the AI marketplace 214. The consumers 234 may select the one or more applications 222 based on the respective insights 224 they produce. Data utilized by the one or more applications 222 may be retrieved from the data marketplace 216 via API 218 based on credentials of the consumer 234.

One skilled in the art may appreciate that insights 224 may be of use to application creators 232 to generate additional insights. For example, an application 222 may comprise determining a number of boxes of a brand of cereal on a shelf in a store, wherein a first insight 224 may comprise a count of cereal boxes of the brand. Then a second application 222 may be configurable to determine if the store needs more cereal from a manufacturer, wherein a second insight 224 may comprise a quantity to be ordered. A third application 222 may be utilized by the manufacturer of the cereal to generate a third insight 224 comprising quantity data of raw ingredients for a future production run to satisfy orders by the store, the production may be facilitated in part by robots 102 which utilize the insights 224 to retrieve items to fulfil the order, and so forth. That is, a sequence of insights 224 may be generated from previous insight data and data from the data marketplace 216 by one or more application creators 232, as shown in FIG. 3.

According to at least one non-limiting exemplary embodiment, application creators 232 and consumers 234 may interface with the developer sandbox 220 to upload applications 222 or receive insights 224 via a web site or web-based terminal. In some embodiments, the application creators 232 and consumers 234 may be requested to utilize a specialized client configured to interface with the AI marketplace 214, and the client may include computer-readable instructions which are executed by a device of the application creators 232 or consumers 234 (e.g., a home PC, a cell phone, tablet, etc.). The website or client may couple a local device of the application creators 232 or consumers 234 to the AI marketplace 214.

Figure 3:
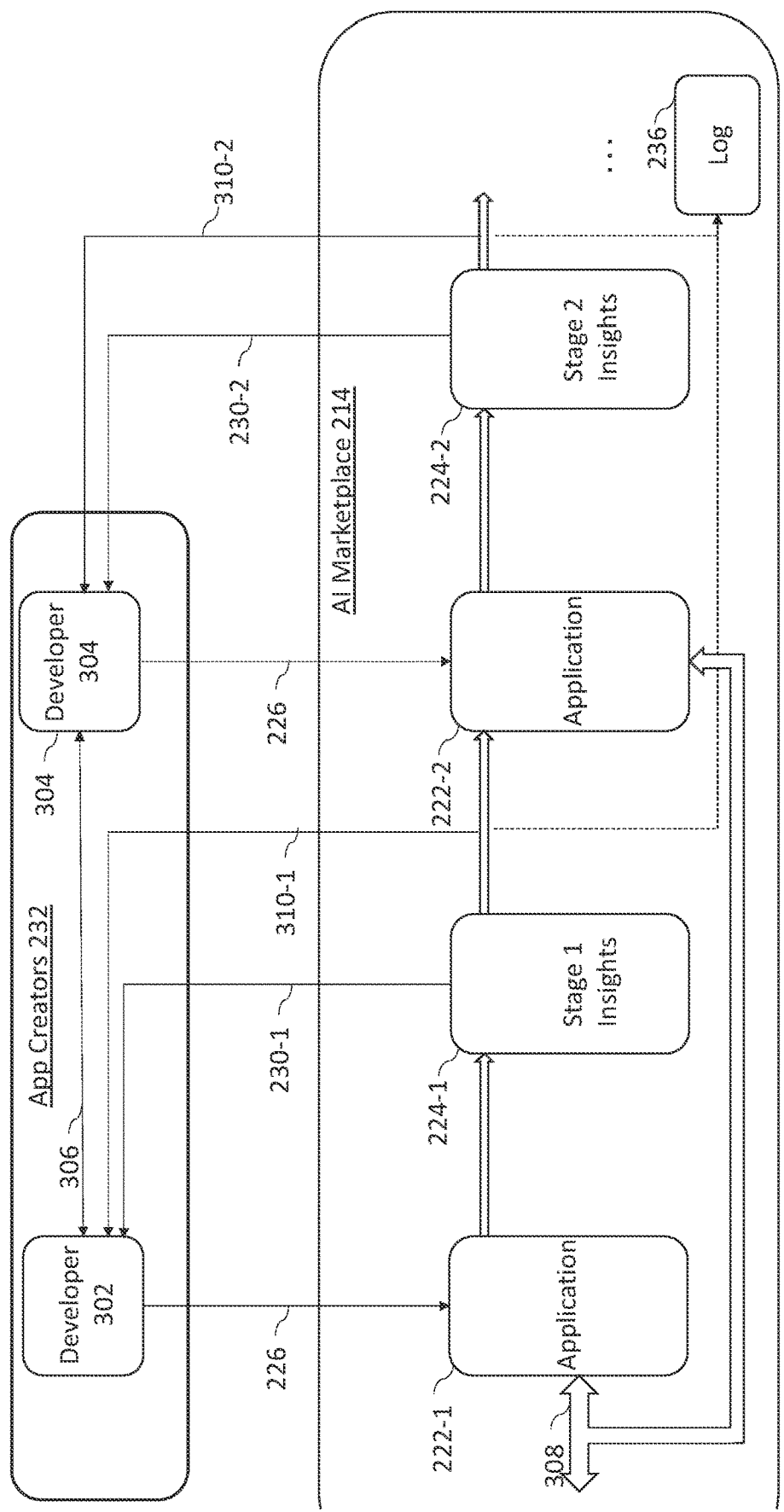
FIG. 3 illustrates an AI marketplace generating a plurality of insights from a data marketplace and previous insights, according to an exemplary embodiment.

FIG. 3 illustrates a sequence of insights 224 generated by a sequence of applications 224 received by an AI marketplace 214 from two application creators 232, denoted as developer 302 and developer 304, according to an exemplary embodiment. Developer 302 may first develop a stage one application 222-1, which performs a first function to generate at least one stage 1 insight 224-1, wherein the application may utilize data path 308 to interface with an API 218 (omitted for clarity) as illustrated in FIG. 2 above to access data of a data marketplace 216. "Stage one" may correspond to the application 222-1 utilizing only data collected by the data sources 202 and no insights 224. Next, a developer 304 may develop a stage two application 222-2 which utilizes at least one of the stage one insights 224-1 in addition to data of the data marketplace 216 to generate at least one stage two insight 224-2, wherein the data of the data marketplace 216 may be communicated to the stage two application 222-2 via data path 308 which interfaces with the API 218. "Stage two" may refer to the application 222-2 utilizing, in part, data from data sources 202 (accessed via API 218) and at least one insight 224-1 from a stage one application 222-1. The at least one insights 224 of stage one and stage two may be returned to developers 302 and 304 via restricted data paths 230-1 and 230-2, respectively, or communicated to a consumer 234 of the two applications 222-1, 222-2.

In order for the developer 304 to access stage 1 insights 224-1 generated by the stage 1 application 222-1, the developer 304 may communicate with the developer 302 via channel 306. Communication via channel 306 may comprise, for example, negotiations of use cases for the stage 1 insights 224-1, a cost based on usage (tracked and communicated via data path 310-1), and/or access credentials to access the stage 1 insights 224-1 (e.g., a key, access code, etc.). The agreement may be external to the AI marketplace 214 (e.g., an in-person agreement) or utilize a user interface or terminal of the developer sandbox 220 to enable the two application developers 302, 304 to communicate. In some instances, upon the developer 302 agreeing to allow the second developer 304 to access insights 224-1, a communication may be sent to the AI marketplace 214 which configures credentials of the second developer 304 to access the insights 224-1. A similar agreement may be made to allow the first developer 302 to utilize insights 224-2 produced by the application 222-2. The agreement may be communicated via a user interface, a wireless signal, a web terminal (e.g., a website), etc. Advantageously, restrictive use of insights 224 by subsequent application creators 232 (e.g., an application 222-2 using insights 224-1 generated by a separate application 222-1) may ensure confidential data of the data marketplace 216 may only be accessed by entities comprising required credentials. Additionally, log 236 may be further configured to track usage (e.g., how frequently and by which entity) of a stage N insight 224 by a stage N+1 application 222, N being a positive integer number, as an additional security measure.

According to at least one non-limiting exemplary embodiment, developer 302 may receive the stage two insight 224-2 produced by the application 222-2 of the second developer 304. Access to the state two insight 224-2 may require an agreement between the two developers 302, 304 which may be communicated to the AI marketplace 214 (e.g., via a user interface or wireless signal), wherein the agreement configures credentials of the first application developer 222-1 to enable the developer 302 to access the stage two insight 224-2.

According to at least one non-limiting exemplary embodiment, data path 308 may further comprise a restricted data path such that stage 1 applications 222-1 may not have full access to data stored in the data marketplace 216 such that owners of data sources 202 (e.g., robot 102 manufacturers, home owners with CCTV devices, etc.) may grant access to application creators 232 of their choosing. This restriction may alternatively be handled by an API 218 as further illustrated in FIG. 5 below.

Figure 4:
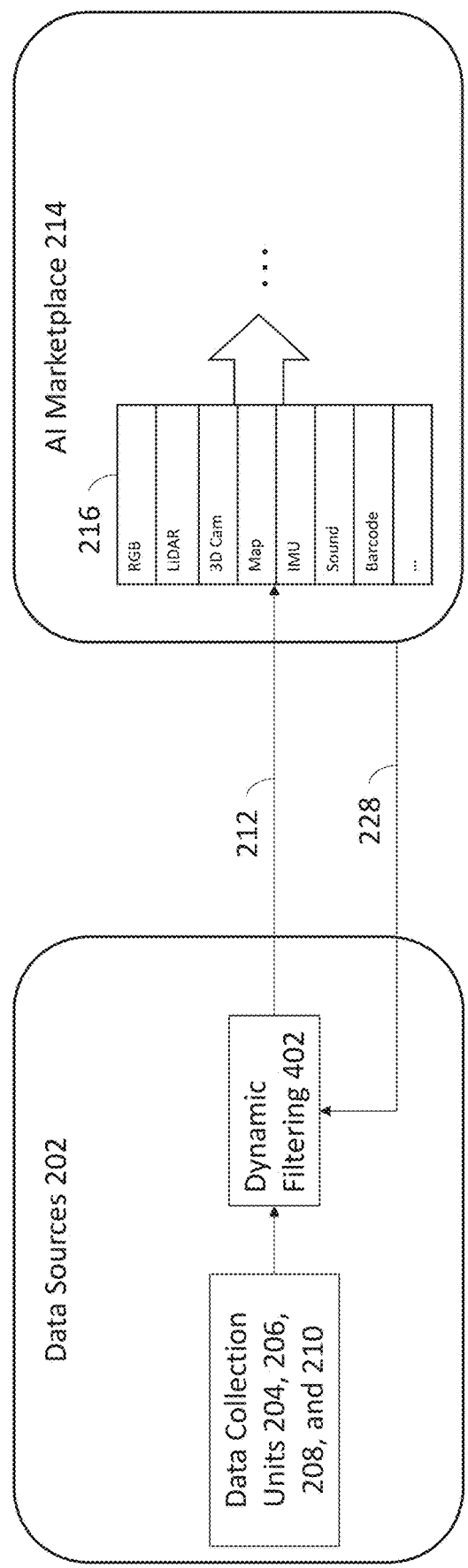
FIG. 4 illustrates a dynamic filtering unit configured to filter data communicated to an AI marketplace, according to an exemplary embodiment.

FIG. 4 is a functional block diagram illustrating a data path between data sources 202 and an AI marketplace 214, according to an exemplary embodiment. Data sources 202 may comprise a plurality of data collection units 204, 206, 208, and 218, described above in FIG. 2, which may communicate their data to a dynamic filtering unit 402 prior to sending the data to a data marketplace 216 of the AI marketplace 214. The dynamic filtering unit 402 may be configured to determine how much data collected by the data sources 202 is communicated to the AI marketplace 214 based on a plurality of parameters. These parameters may configure the dynamic filtering unit 402 to output large or small amounts of data (i.e., unfiltered or filtered data) to the AI marketplace 214. For example, the dynamic filtering unit 402 may determine data from a robot 102 is rich or valuable based on identification of a plurality of salient features in image data (e.g., many humans detected at a location, image data of complex objects like store shelves), measurements of important objects or landmarks in an environment, IMU navigation data of the robot 102 navigating a complex maneuver, and the like. Alternatively, the dynamic filtering unit 402 may determine data from a robot 102 is poor based on a lack of salient features in image data (e.g., no humans detected, an image of a blank wall, etc.), measurements of unimportant objects (e.g., walls), IMU data as the robot 102 navigates a straight path, repetitive data (e.g., image data collected by a robot 102 at a single location multiple times in quick succession), and the like. The dynamic filtering unit 402 may be configured to determine if data from data sources 202 is rich or poor by executing specialized algorithms (e.g., image processing algorithms) from a memory.

If the dynamic filtering unit 402 determines incoming data from the data sources 202 is poor, the dynamic filtering unit 402 may filter at least a portion of the incoming data. For example, poor image data (e.g., images comprising mostly image data of a blank wall) may be communicated to the AI marketplace 214 with a lower resolution, measurement data may be clipped to comprise fewer significant figures, video data at a lower frame rate, and/or the data may be filtered entirely (i.e., not communicated to the AI marketplace 214). Alternatively, if the dynamic filtering unit 402 determines the incoming data is rich, the dynamic filtering unit 402 may pass all or a substantial amount of the raw data to the AI marketplace 214. The dynamic filtering unit 402 may additionally receive a feedback signal 228, illustrated in FIG. 2 above, to configure the dynamic filtering unit 402 to output more data (i.e., less filtering) or less data (i.e., more filtering) if requested. It is appreciated by one skilled in the art that the dynamic filtering unit 402 may determine the incoming data may lie between rich and poor data (i.e., some data may be decent, not poor yet not rich) and may filter the data accordingly, wherein determining if data is either rich or poor (i.e., a binary choice) is not intended to be limiting.

According to at least one non-limiting exemplary embodiment, dynamic filtering unit 402 may determine that data collected by a robot 102 should or should not be filtered based on a location of the robot 102 within its environment. For example, the robot 102 may utilize a computer-readable map to navigate its environment, wherein the map may denote certain regions as feature-rich or feature-poor. Feature-rich regions may include areas in the environment which are crowded, comprise a plurality of features/objects, include complicated robotic tasks, and the like. Feature poor regions may include hallways, empty space, and/or less crowded regions of the environment. For example, if during navigation of a route a robot 102 detects a plurality of moving objects and/or salient objects (e.g., a very colorful region of the environment) at a first location, the dynamic filtering unit 402 may upload more data from sensor units 114 of the robot 102 to the data marketplace 216 as compared to a second location which may comprise few moving objects and/or salient features. In some embodiments, uploading of more or less data may correspond to more or less compression or down sampling of sensor unit 114 and/or navigation unit 106 data prior to the compressed/down-sampled data being provided to the data marketplace 216.

According to at least one non-limiting exemplary embodiment, data sources 202 may comprise dynamic-filtering units 402, wherein the dynamic-filtering unit 402 may not be a standalone module. For example, dynamic-filtering unit 402 may be illustrative of a processing device 138 of the data sources 202 (e.g., controller 118 of a robot 102) executing computer-readable instructions from a non-transitory memory. According to at least one non-limiting exemplary embodiment, a dynamic filtering unit 402 may be a functional block of an AI marketplace 214 configured to dynamically filter incoming data 212 prior to storing the incoming data 212 to the data marketplace 216.

According to at least one non-limiting exemplary embodiment, dynamic filtering unit 402 may additionally filter data from a data source 202 based on received data from a plurality of other data sources. For example, image data from a robot 102 may be determined to be poor if image data from a CCTV camera, which includes a field of view encompassing the robot 102, comprises no humans within a static environment.

According to at least one non-limiting exemplary embodiment, data collection sources 202 may be communicatively coupled to a local network (e.g., cloud server, a local Wi-Fi network, etc.). This local network may be further communicatively coupled to an AI marketplace 214 and may communicate data and metadata 212 and provide dynamic filtering of the data and metadata 212 from the data collection sources 202 to the AI marketplace 214. That is, direct coupling of data sources 202 to the AI marketplace 214 is not intended to be limiting, wherein the coupling of the data sources 202 to the AI marketplace 214 may include the use of relays and routers as appreciated by one skilled in the art.

Advantageously, dynamic filtering of data arriving from the data collection units 204, 206, 208, and 210 may be utilized to reduce memory space required to store the incoming data 212 in a memory of the AI marketplace 214. Additionally, filtering poor data from the data marketplace 214 may further enhance functions of applications 222 as poor data (i.e., noisy data, uninteresting data, etc.) may be dynamically filtered from the data marketplace 216 such that only rich data is utilized by the applications 222.

Figure 5:
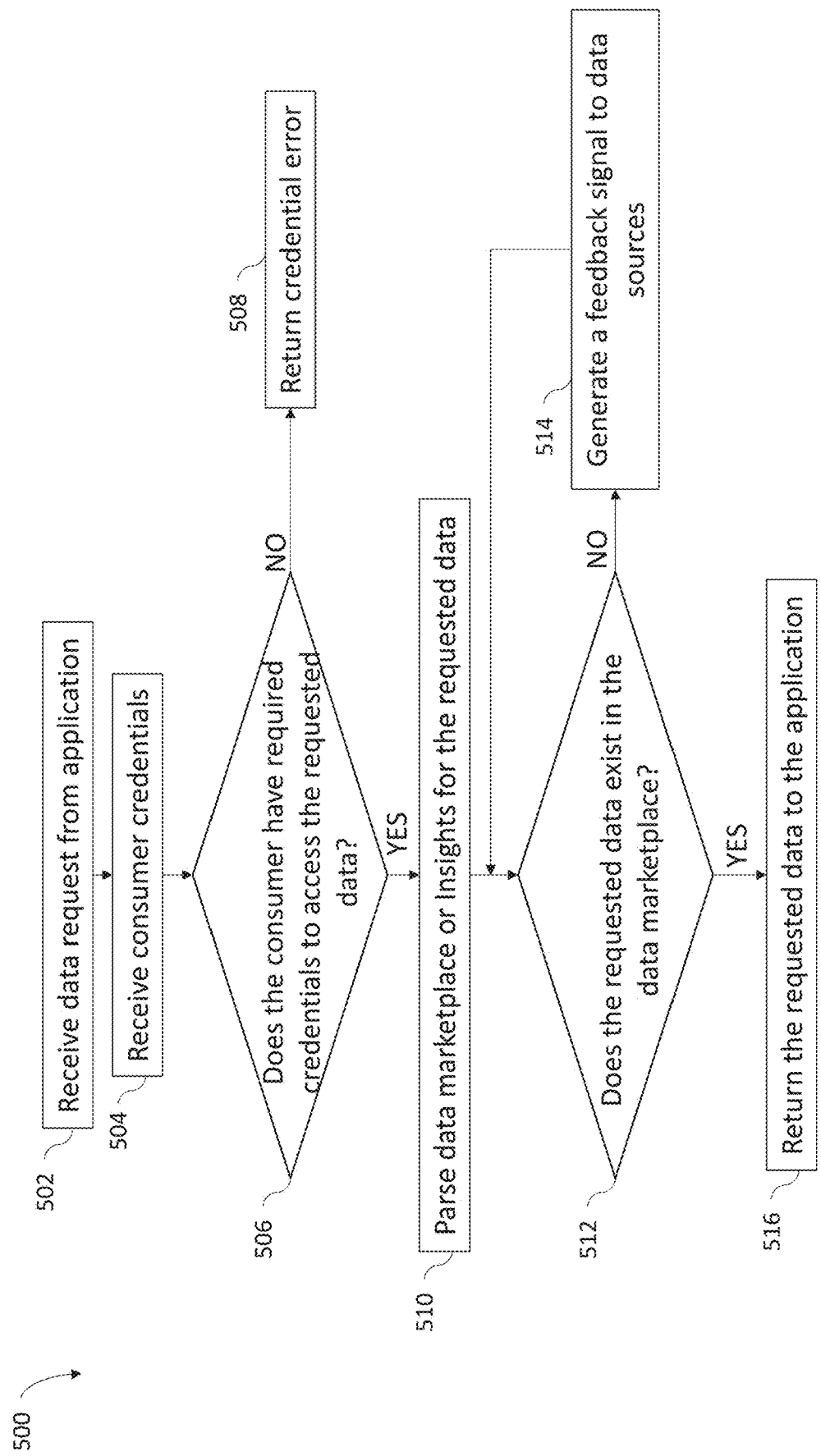
FIG. 5 is a process flow diagram illustrating a method for an API of an AI marketplace to handle a data request from an application, according to an exemplary embodiment.

FIG. 5 is a process flow diagram illustrating a method 500 for an API 218 to handle a data request from an application 222, according to an exemplary embodiment. The application 222 may comprise analysis or processing of some data stored in a data marketplace 216, and the analysis or processing may be configured by an application creator 232. It is appreciated that any steps performed by the API 218 may be illustrative of a processor 130 executing computer-readable instructions from a non-transitory memory 132. Additionally, it is appreciated that data of the data marketplace 216 may be stored in one or more computer-readable storage mediums. The application 222 may be executed for a consumer 234 to provide insights 224 to the consumer 234. The application creator 232 and consumer 234 may include the same or different entities.

Block 502 illustrates the API 218 receiving a data request from the application 222. The data request may comprise a request for a type of data or metadata stored in the data marketplace 216. For example, the data request may comprise a request for a CCTV video feed at a specified time to be utilized for some function of the application 222. As another example, the request may include images captured by robots 102 at specific locations, wherein the data marketplace 216 may include metadata or navigation data (e.g., computer-readable maps, IMU data, etc.) associated with image data collected by the mobile robot data sources 210, which denotes the location of the robots 102 during acquisition of the images. In some instances, the request may comprise a request to access an insight 224 produced by one or more different applications 222.

Block 504 illustrates the API 218 receiving the credentials of the consumer 234. The credentials may comprise, for example, access codes, a user ID, a private key, and the like which enable the AI marketplace 214 to associate the consumer 234 credentials with a set of data that the consumer 234 may access during execution of the application 222. The credentials may be utilized by the API 218 to determine if the consumer 234 of the insights 224 from the application 222 may access the requested data as a security measure to ensure data collected by owners of data sources 202 may be accessed by specified entities with the required credentials. For example, a consumer 234 may include a manager at an airport, wherein the credentials provided to the API 218 may configure the API 218 to only provide data collected by data sources 202 within the airport.

Block 506 illustrates the API 218 determining if the application creator 232 possesses necessary credentials to access the requested data. This determination may be performed by, for example, comparing a user ID of the application creator 232 to an allowed user ID list or comparing an access code provided to the API 218 by the application creator 232. It is appreciated that data from the data collection sources 202 may be restricted by owners or operators of the data sources 202 (e.g., store owners may restrict CCTV data access).

Upon the API 218 determining the application creator 232 possesses necessary credentials to access the data, the API 218 may move to block 510.

Upon the API 218 determining the application creator 232 does not possess the necessary credentials to access the data, the API 218 may move to block 508 to return a credential error (e.g., NULL value, 0 value, etc.) to the application 222.

Block 510 illustrates the API 218 parsing the data marketplace 216 for the requested data. Data stored in the data marketplace 216 may be organized in an indexable or searchable format such that the request for data may be quickly processed. The organization format may include, without limitation, a network graph, a ledger, binning, indexable libraries, and the like. The API 218 may parse the data marketplace 216 based on, for example, metadata of the data request (e.g., based on the time of a requested CCTV video feed), following nodes and links of a network graph, searching through specified libraries, and/or other methods of search based on the organization of the data. In some embodiments, data stored in the data marketplace 216 may be indexed with credentials required to access the data.

Block 512 illustrates the API 218 determining if the requested data exists in the data marketplace 216. For example, a data request may comprise a request for data to be collected at a later time (e.g., specified by metadata of the request). As another example, the requested data may comprise RGB image data of a portion of an environment that a robot mobile data source 210, operating within the environment, has not captured nor navigated to. As another example, the data requested may be specific and require the use of a feedback signal 228 to configure one or more data sources 202 to collect the requested data, as shown in block 514.

Upon the API 218 determining the requested data exists in the data marketplace 216, the API 218 may move to block 516 and return the requested data back to the application 222.

Upon the API 218 determining the requested data does not exist in the data marketplace 216, the API 218 may move to block 514.

Block 514 illustrates the API 218 generating a feedback signal to data sources 202. The feedback signal to the data sources 202 configure the data sources 202 to collect the requested data for the application 222 by, for example, navigating a mobile robot data source 210 to a desired location, changing a pose of a stationary data source 204, or parsing a public data source 206.

One skilled in the art may appreciate that a substantially similar method for an API 218 to handle a request for an insight request, comprising a request for an insight 224 for use by an application 222. That is, the API 218 may verify an application creator 232 of the application 222 possesses necessary credentials to access the requested insight 224 and return a credential error if the credentials received are not sufficient or return the insight 224 if the credentials received are sufficient. The API 218, when handling insight requests, may not be required to make the determination illustrated in block 512 as the requested insight may be generated by a separate lower stage application, wherein the lower stage application may follow the method 500 illustrated (i.e., including block 512) to request data to generate the requested insight which may comprise the determination in block 512.

Figure 6:
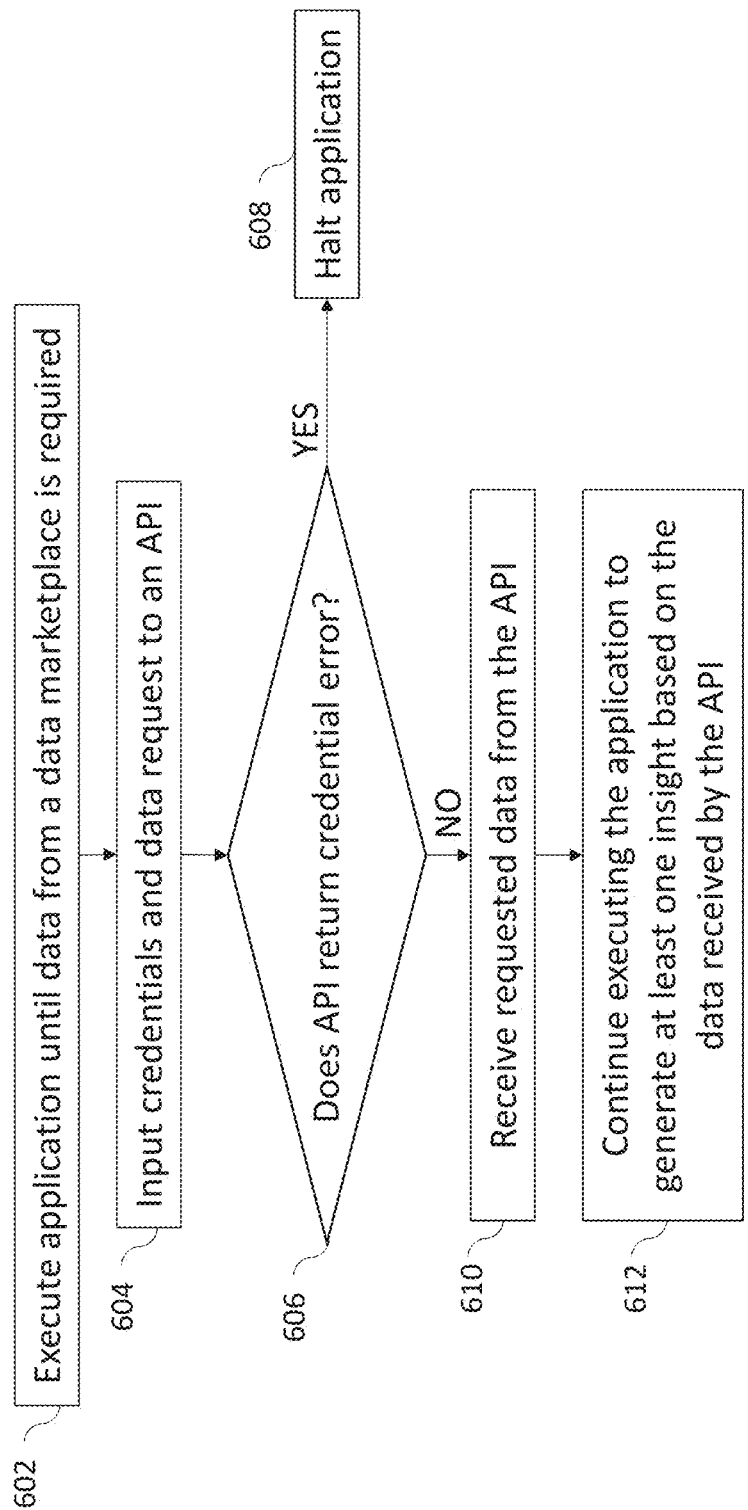
FIG. 6 is a process flow diagram illustrating a method for an application to request and receive data from a data marketplace via an API, according to an exemplary embodiment.

FIG. 6 is a process flow diagram illustrating a method 600 for an AI marketplace 214 to execute an application 222, according to an exemplary embodiment. It is appreciated by one skilled in the art that any steps performed by the application 222 in the method 600 may be illustrative of a processing device 138 of the AI marketplace 214 (e.g., of developer sandbox 220) executing specialized instructions. It is further appreciated that the AI marketplace 214 may be provided credentials of a consumer 234 of the insights 224 produced by the application 222, wherein the credentials may grant access to the application 222 some data of a data marketplace 216 while restricting access to other data.

Block 602 illustrates the application 222 being executed until data from the data marketplace 216 is required by the application 222. For example, an application may perform some mathematical operations, initialization operations, or other instructions prior to requesting any data for processing. If the application 222 does not require data from the data marketplace 214, then the one or more processing devices 138 may execute the application 222 to produce one or more insights 224. If the application 222 does require the use of data collected by data sources 202 and stored in the data marketplace 214 or an insight 224 produced by a different application 222, the application 222 may continue to block 604.

Block 604 illustrates the application 222 communicating the credentials of the application creator 232 to an API 218. The credentials may provide the API 218 with information related to what data of the data marketplace 214 the application 222 may access.

Block 606 illustrates the application 222 determining if the API 218 returns a credential error. A credential error may correspond to the credentials of the consumer 234 being insufficient to access the requested data. The credential error may comprise, for example, a return value of zero, NULL, or other predetermined value from the API 218.

Upon the application 222 receiving a credential error from the API 218, the application 222 moves to block 608 to halt the application 222. In some instances, the application 222 may continue execution without the requested data if the application creator 232 configured the application 222 to handle such case.

Upon the application 222 not receiving a credential error from the API 218, the application 222 moves to block 610 to continue execution.

Block 610 illustrates the application 222 receiving requested data from the API 218. The API 218 may utilize a method 500 illustrated in FIG. 5 above to generate, localize in memory, and/or communicate the requested data to the application 222. The requested data may comprise, for example, RGB images from a CCTV camera, IMU data of a robot 102 navigating a route, LiDAR measurements of an environment from a robot 102, and/or any other data collected by data sources 202.

Block 612 illustrates executing the application 222 to generate at least one insight 224 based on the data received by the API 218. The application 222 may, upon requiring additional data from the data marketplace 214, repeat the method 600 to request and receive additional data from the API 218.

According to at least one non-limiting exemplary embodiment, the data request may comprise a request for an insight generated by a separate application 222, wherein an API may receive credentials of the consumer 234 and provide the requested insight if the credentials are sufficient following a method substantially similar to method 500 illustrated above in FIG. 5.

Figure 7:
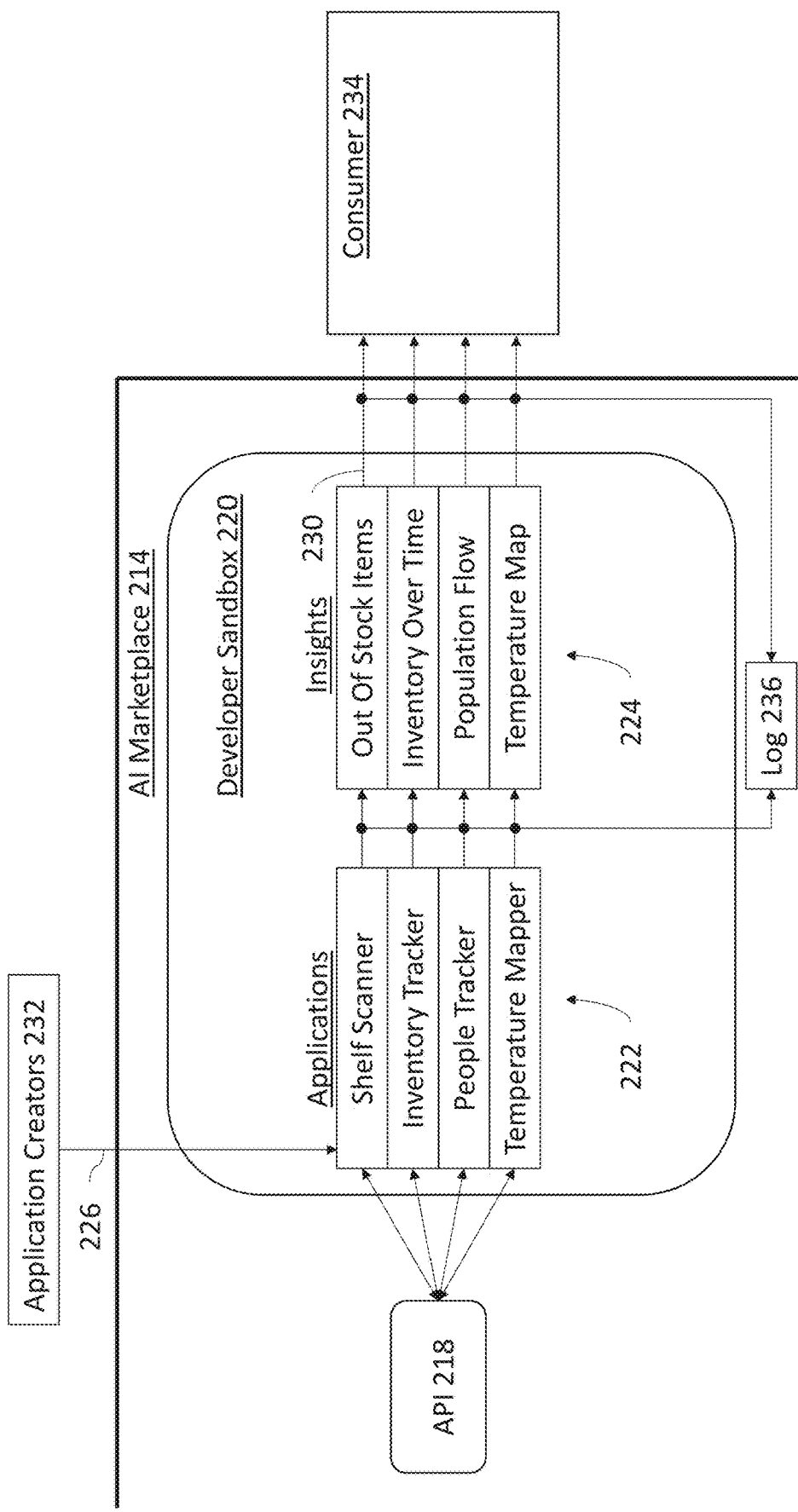
FIG. 7 is an exemplary embodiment of functional block diagram illustrating a consumer receiving insights produced by applications of the AI marketplace.

FIG. 7 is a functional block diagram illustrating a consumer 234 receiving insights 224 produced by applications 222 of the AI marketplace 214, the applications being provided to the AI marketplace 214 by one or more application creators 232, according to an exemplary embodiment. The consumer 234 may utilize either a web-based interface, client-based interface (e.g., a client installed on a local device), or other user interface to browse applications 222 created by application creators 232. The consumer 234 may include a store owner who desires to utilize data collected by one or more robots 102 and/or IoT devices 208 which operate within their store for additional insights 224 which may be of use for improving operations of the store. Accordingly, the store manager may select four applications 222 which include a "shelf scanner," an "inventory tracker," a "people tracker," and a "temperature mapper," however one skilled in the art may appreciate that these exemplary applications 222 are purely illustrative, wherein a consumer 234 may select more or fewer of the same or different applications 222.

Each application 222 may produce at least one insight 224. For example, the shelf scanner application 222 may utilize RGB image data from sensor units 114 of a robot 102 which operates within the store to identify items that are out of stock. As another example, the inventory tracker application 222 may track inventory (e.g., back-of-house inventory) over time using data from checkout registers (i.e., stationary data sources 204) and/or back-of-house inventory data (e.g., from hand-held barcode scanners used by associates) to provide statistics useful to the store owner for ordering future stock. The people tracker may utilize data from sensor units 114 of the robot 102 and/or CCTV camera data, for example, from IoT security cameras to track the flow of people within the store such that the store layout (i.e., locations of items) may be configured to reduce congestion. Lastly, the temperature mapper may utilize the position data of the robot 102 and temperature measurements taken by a thermometer sensor of the robot 102 to generate a heat map of the store which may be of utility to the store owner to determine if an air vent is broken or if the air conditioning should be enabled in specific areas. These insights 224 are purely illustrative of exemplary insights 224 which may be produced by an exemplary set of applications 222 and are not intended to be limiting. One skilled in the art may appreciate that a single application 222 may produce two or more insights 224 (e.g., shelf scanner application 222 may identify out of stock items and misplaced items). In some instances, an insight 224 may be utilized as an input to an application 222 (e.g., out-of-stock items may be utilized by the inventory tracker application), wherein the insight 224 may be stored in the data marketplace 214 and accessed by an application 222 via the API 218.

The AI marketplace 214 may communicate any or all insights 224 to the consumer 234 via the web-based terminal or the local client of the consumer 234. The output of the insights 224 may be tracked via log 236 which records incoming and outgoing data from the developer sandbox 222. More specifically following the above example, the log 236 may include data which tracks the specific store owner (e.g., identified with a client ID or other unique identifier) receiving the four insights over a period of time. In some instances, the consumer 234 may be required to pay a fee to the application creators 232 for use of these insights 224 and/or their applications 222, wherein data stored in the log 236 may be of use for billing. Additionally, the production of the insights 224 or execution of the applications 222 are tracked by the log 236 over time for substantially the same reasons and/or for data security. With regard to data security, it is appreciated that neither the consumer 234 nor application creators 232 may view sensitive data stored in the data marketplace 216. Similarly, the application creators 232 may not receive the insights 224 of their applications 222, unless given credentials to do so from the consumer 234, as the insights 224 may be utilized by a specific consumer 232 and may include the use of confidential data (e.g., internal layout of the store). That is, the applications 222 may be configured to be generally applicable (e.g., temperature mapper application may be used in any environment with a robot 102) while the usage of the applications 222 may be specific to the consumer 234 and include the use of data which may be confidential. However, the application creators 232 may receive data stored in the log 236, which tracks usage of their applications 222. The consumer 234 may only receive the insights 224 produced by the applications 222, wherein the applications 222 may be executed by processing devices 138 of the AI marketplace 214 and not executed locally (e.g., on the home PC of consumer 234).

According to at least one non-limiting exemplary embodiment, an application creator 232 may specify a fee for the use of an application 222 created by the application creator 232. The fee may include a price per production of an insight 224 and/or the price for use of the application over a specified period of time (e.g., price per hour). Accordingly, the one or more processing devices 138 of the AI marketplace 214 may produce invoices to consumers 234 who utilize the application 222 based on usage data stored in the log 236. In some instances, the consumer 234 may be invoiced for usage of the processing devices 138 of the AI marketplace 214 (e.g., by the owner of the AI marketplace 214). In some instances, consumers 234 and application creators 232 may provide the AI marketplace 214 with account information that enables direct deposit or transfer of digital currency (e.g., cryptocurrencies) or digital fiat currency from one account to another. The AI marketplace 214 may automatically transfer funds if payment is due for the use of insights 224, provided the respective account includes the requisite funds. In some embodiments, the consumer 234 may be invoiced based on the use of data collection sources 202 such as, for example, to access any of data sources 202 (e.g., a fee for access) or to produce a feedback signal 228 to cause a robot 102 to perform a task (e.g., a fee for robot time), wherein the invoice may configure payment of a fee to the owner of the data collection sources 202. In some embodiments, data of the data marketplace 216 accessed by an application 222 in use by a consumer 234 may comprise a fee based on the size of the data accessed, the fee being charged to the consumer 234. For example, uploading a point cloud representation of an environment produced by a robot 102 LiDAR sensor may utilize substantially more communications bandwidth than uploading of a 2-dimensional map of the environment, wherein the LiDAR point cloud may include a higher fee for use than the map.

According to at least one non-limiting exemplary embodiment, the API 218 may utilize credentials of the consumer 234 to access specified data stored within the data marketplace 216. For example, the credentials of the consumer 234 may configure a general-purpose application 222 (e.g., a temperature mapper which is generally applicable to any data source 202 which collects temperature and position data) to only utilize data from a specific robot 102, such as a robot 102 owned by the consumer 234.

Figure 8:
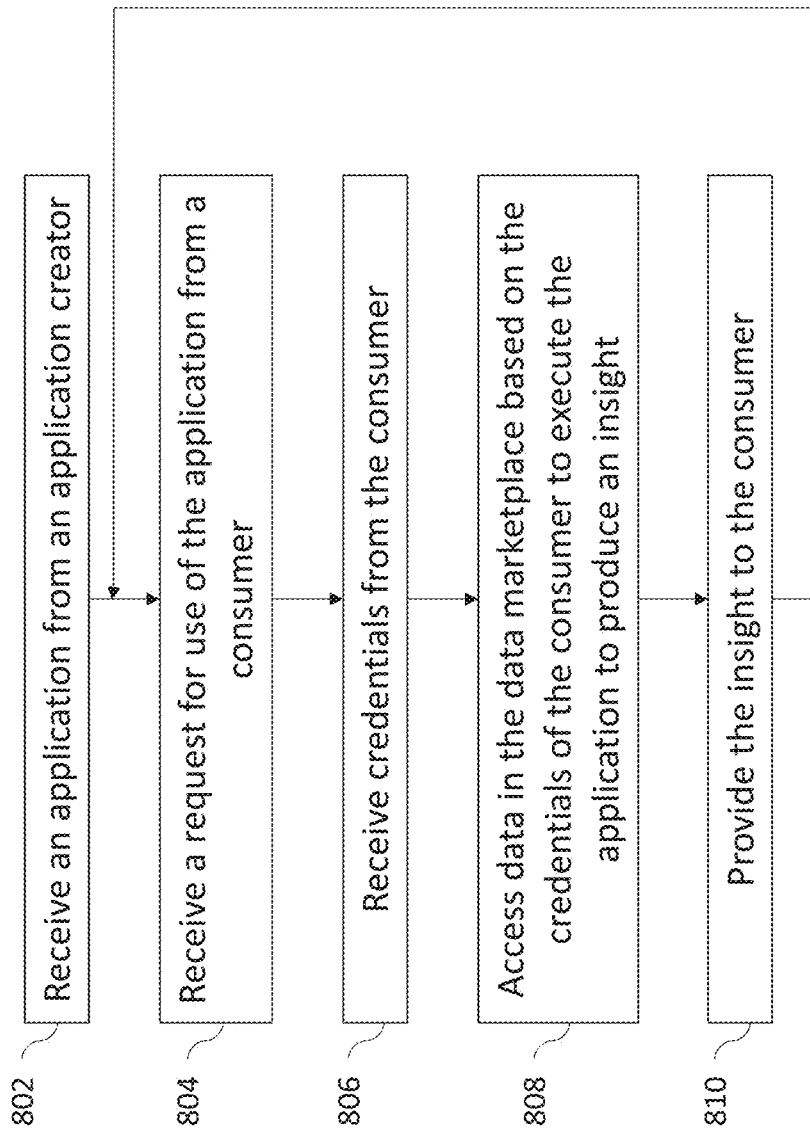
FIG. 8 is an exemplary embodiment of a process flow diagram illustrating a method for a processing device of the AI marketplace to receive and execute an application.

FIG. 8 is a process flow diagram illustrating a method 800 for a processing device 138 of the AI marketplace 214 to receive and execute an application 222, according to an exemplary embodiment. It is appreciated that steps of method 800 may be effectuated by the processing device 138 executing computer-readable instructions.

Block 802 comprises the processing device 138 receiving an application 222 from an application creator 232. The application 222 may be configured to be general purpose or specific to one or more environments or uses. As an example of a general-purpose application 222, the application 222 may be configured to identify humans in images, wherein the images may be captured by any sensor unit 114 of a robot 102 and/or other data collection devices 202. An example of a specific application 222 may be comprised of an application 222 configured to identify spills on a floor for use by cleaning robots 102. The application creator 232 may utilize either a web-based terminal or local client to interface with the developer sandbox 220 of the AI marketplace 214 to upload their application 222. The uploading of the application 222 may be tracked via the log 236.

Block 804 comprises the processing device 138 receiving a request for use of the application 222 from a consumer 234. The request may be received via the consumer 234 using a web-based terminal or local client which couples a device (e.g., a home PC, smartphone, tablet, etc.) of the consumer 234 to the AI marketplace 214.

Block 806 comprises the processing device 138 receiving credentials of the consumer 234. The credentials may correspond to a set of permissions for access to data stored in the data marketplace 216. For example, the consumer 234 may include a store owner, wherein credentials of the store owner may allow applications 222 utilized by the store owner to access data collected by data sources 202 within the store and not access data collected by data sources 202 in other stores. Data stored in the data marketplace 216 may include metadata which, at least in part, denotes a data collection device 202 associated with the stored data (e.g., an RGB image may include metadata that denotes the image was captured by a specific sensor on a specific robot 102). Accordingly, the credentials may denote a specified set of data collection sources 202 from which data stored in the data marketplace 216 may be accessed for use by the application 222.

Block 808 comprises the processing device 138 accessing data in the data marketplace 216 based on the credentials of the consumer 234, the data being used to execute the application 222 to produce at least one insight 224. The credentials of the consumer 234 may be utilized by the API 218 to configure the API 218 to retrieve data from the data marketplace 216 collected by one or more data sources 202, the one or more data sources 202 chosen is based on the credentials of the consumer 234.

Block 810 comprises the processing device 138 providing the insight 224 produced by the application 222 to the consumer 234. The production and communication of the insight 224 may be stored in the log 236. The insight 224 may be provided via the web-based terminal or local client of the consumer 234.

It will be recognized that while certain aspects of the disclosure are described in terms of a specific sequence of steps of a method, these descriptions are only illustrative of the broader methods of the disclosure, and may be modified as required by the particular application. Certain steps may be rendered unnecessary or optional under certain circumstances. Additionally, certain steps or functionality may be added to the disclosed embodiments, or the order of performance of two or more steps permuted. All such variations are considered to be encompassed within the disclosure disclosed and claimed herein.

While the above detailed description has shown, described, and pointed out novel features of the disclosure as applied to various exemplary embodiments, it will be understood that various omissions, substitutions, and changes in the form and details of the device or process illustrated may be made by those skilled in the art without departing from the disclosure. The foregoing description is of the best mode presently contemplated of carrying out the disclosure. This description is in no way meant to be limiting, but rather should be taken as illustrative of the general principles of the disclosure. The scope of the disclosure should be determined with reference to the claims.

While the disclosure has been illustrated and described in detail in the drawings and foregoing description, such illustration and description are to be considered illustrative or exemplary and not restrictive. The disclosure is not limited to the disclosed embodiments. Variations to the disclosed embodiments and/or implementations may be understood and effected by those skilled in the art in practicing the claimed disclosure, from a study of the drawings, the disclosure and the appended claims.

It should be noted that the use of particular terminology when describing certain features or aspects of the disclosure should not be taken to imply that the terminology is being re-defined herein to be restricted to include any specific characteristics of the features or aspects of the disclosure with which that terminology is associated. Terms and phrases used in this application, and variations thereof, especially in the appended claims, unless otherwise expressly stated, should be construed as open ended as opposed to limiting. As examples of the foregoing, the term "including" should be read to mean "including, without limitation," "including but not limited to," or the like; the term "comprising" as used herein is synonymous with "including," "containing," or "characterized by," and is inclusive or open-ended and does not exclude additional, unrecited elements or method steps; the term "having" should be interpreted as "having at least;" the term "such as" should be interpreted as "such as, without limitation;" the term 'includes" should be interpreted as "includes but is not limited to;" the term "example" is used to provide exemplary instances of the item in discussion, not an exhaustive or limiting list thereof, and should be interpreted as "example, but without limitation"; adjectives such as "known," "normal," "standard," and terms of similar meaning should not be construed as limiting the item described to a given time period or to an item available as of a given time, but instead should be read to encompass known, normal, or standard technologies that may be available or known now or at any time in the future; and use of terms like "preferably," "preferred," "desired," or "desirable," and words of similar meaning should not be understood as implying that certain features are critical, essential, or even important to the structure or function of the present disclosure, but instead as merely intended to highlight alternative or additional features that may or may not be utilized in a particular embodiment. Likewise, a group of items linked with the conjunction "and" should not be read as requiring that each and every one of those items be present in the grouping, but rather should be read as "and/or" unless expressly stated otherwise. Similarly, a group of items linked with the conjunction "or" should not be read as requiring mutual exclusivity among that group, but rather should be read as "and/or" unless expressly stated otherwise. The terms "about" or "approximate" and the like are synonymous and are used to indicate that the value modified by the term has an understood range associated with it, where the range may be ±20%, ±15%, ±10%, ±5%, or ±1%. The term "substantially" is used to indicate that a result (e.g., measurement value) is close to a targeted value, where close may mean, for example, the result is within 80% of the value, within 90% of the value, within 95% of the value, or within 99% of the value. Also, as used herein "defined" or "determined" may include "predefined" or "predetermined" and/or otherwise determined values, conditions, thresholds, measurements, and the like.

What is claimed is:
1. A system, comprising:
a plurality of data collection devices coupled to a server;
a non-transitory computer readable memory comprising a plurality of computer readable instructions stored thereon; and
at least one processor configured to execute the computer readable instructions to:
receive an application from an application creator;
receive data from a respective one of the plurality of data collection devices;
execute the application to generate at least one insight using the data received from the respective one of the plurality of data collection devices;
generate a feedback signal based on a request from the application and providing the feedback signal to a dynamic filtering unit, wherein the feedback signal configures the dynamic filtering unit to filter data collected by the respective one of the plurality of data collection devices based at least in part on a computer readable map, the computer readable map comprises regions that are denoted as feature-rich regions based on the feedback signal, the feature-rich regions comprising at least one of a plurality of features and maneuvering to be performed by the respective one of the data collection devices,
wherein the dynamic filtering unit is configured to exclude data collected outside of the feature-rich regions, and
wherein the dynamic filtering unit is configured to upload additional data collected by one or more sensor units coupled to the respective one of the data collection devices if feature-rich regions are denoted on the computer readable map.

2. The system of claim 1, wherein the at least one processor is further configured to execute the computer readable instructions to:
generate the feedback signal based on a data request from the application, the feedback signal is communicated to a robotic device of the plurality of data collection devices, the feedback signal comprising a request to navigate the robotic device to a location to collect additional data.

3. The system of claim 2, wherein the at least one processor is further configured to execute the computer readable instructions to:
filter data collected by the respective one of the plurality of data collection devices based on the feedback signal and a determination of value of the data collected.

4. The system of claim 1, wherein the at least one processor is further configured to execute the computer readable instructions to:
execute a different second application to generate at least one second insight based on the data from the respective one of the plurality of data collection devices and the at the least one insight.

5. The system of claim 4, wherein the at least one processor is further configured to execute the computer readable instructions to:
generate a log comprising a record of usages of the at least one insight by the different second application.

6. The system of claim 1, wherein the data collection devices comprise of one or more of robots and at least one of a stationary device, internet of things (IoT) device, or database communicatively coupled to the server.

7. The system of claim 6, wherein the one or more robots include at least one robotic floor cleaner.

8. The system of claim 1, wherein the at least one processor is further configured to execute the computer readable instructions to:
restrict access to data collected by the data collection devices based on credentials of a consumer of the at least one insight, the restriction of access being performed by an application programing interface (API).

9. The system of claim 8, wherein,
the non-transitory computer readable memory contains data representing credentials of the consumer, the credentials enable the application to access certain data collected by the data collection sources, the access being provided by the API verifying the credentials of the application creator are sufficient to access the data.

10. The system of claim 9, wherein the consumer includes at least one of a robot, another application, or a human.

11. The system of claim 1, further comprising:
a user interface configured to receive the application from the application creator, the user interface includes one of a user interface of a robot, a client interface being embodied on a local device of the application creator which couples the local device to the server, or a web terminal or website.

12. The system of claim 1, further comprising:
a user interface configured to receive a request for use of the application by a consumer, the user interface includes one of a user interface of a robot, a client interface being embodied on a local device of the consumer which couples the local device to the server, or a web terminal or site.

13. The system of claim 12, wherein,
the application is executed by the at least one processor of the server; and the at least one insight is received by the consumer using the user interface.

14. The system of claim 13, wherein,
the receipt of the at least one insight is recorded by the at least one processor of the server and stored in a log; and
the application creator can view the log to view the receipt of the at least one insight by the consumer.

15. The system of claim 14, wherein the at least one processor is further configured to execute the computer readable instructions to:
produce an invoice to the consumer based on the usage of the insights stored in the log, the invoice configures payment at least in part to the application creator.

16. The system of claim 1, wherein,
the at least one insight of the application is at least one of: item identification, signal strength mapping of a Wi-Fi or cellular signal, or identification of people using data collected at least in part by one or more robotic devices.

17. A system, comprising:
a memory comprising a plurality of computer readable instructions embodied thereon; and at least one processor configured to execute the computer readable instructions to:
receive a request for use of an application from a consumer device, the application being stored in the memory;
execute the application using data collected at least in part by one or more data sources to produce an insight, the one or more data sources comprise at least one robotic device;
communicate the insight to the consumer device; and
generate a feedback signal based on a request from the application and providing the feedback signal to a dynamic filtering unit, wherein the feedback signal configures the dynamic filtering unit to filter data collected by the respective one of the plurality of data collection devices based at least in part on a computer readable map, the computer readable map comprises regions that are denoted as feature-rich regions based on the feedback signal, the feature-rich regions comprising at least one of a plurality of features and maneuvering to be performed by the respective one of the data collection devices,
wherein the dynamic filtering unit is configured to exclude data collected outside of the feature-rich regions, and
wherein the dynamic filtering unit is configured to upload additional data collected by one or more sensor units coupled to the respective one of the data collection devices if feature-rich regions are denoted on the computer readable map.

18. A method, comprising:
receiving a request for use of an application from a consumer device, the application being stored in a memory;
executing the application using data collected at least in part by one or more data sources to produce an insight;
generating a feedback signal based on a data request from the application, wherein the feedback signal is communicated to a dynamic filtering unit, upon receipt the dynamic filtering unit is configured to filter data collected by the respective one of the plurality of data collection devices based at least in part on a computer readable map, the computer readable map comprises regions noted as feature-rich regions, wherein the feature-rich regions comprises a at least one of a plurality of features and maneuvering to be performed by the respective one of the data collection devices;
wherein the dynamic filtering unit is configured to exclude data collected outside of the feature-rich regions; and
wherein the dynamic filtering unit is configured to upload additional data collected by one or more sensor units coupled to the respective one of the data collection devices if feature-rich regions are denoted on the computer readable map.

* * * * *